US012374688B2

(12) United States Patent
Sun et al.

(10) Patent No.: US 12,374,688 B2
(45) Date of Patent: Jul. 29, 2025

(54) POSITIVE ACTIVE MATERIAL, METHOD OF PREPARING THE SAME, AND LITHIUM SECONDARY BATTERY INCLUDING THE SAME

(71) Applicant: BATTERY SOLUTION, Seoul (KR)

(72) Inventors: Yang-Kook Sun, Seoul (KR); Chong-Seung Yoon, Seoul (KR)

(73) Assignee: BATTERY SOLUTION, Seoul (KR)

( * ) Notice: Subject to any disclaimer, the term of this patent is extended or adjusted under 35 U.S.C. 154(b) by 612 days.

(21) Appl. No.: 16/961,672

(22) PCT Filed: Jan. 14, 2019

(86) PCT No.: PCT/KR2019/000559
§ 371 (c)(1),
(2) Date: Jul. 11, 2020

(87) PCT Pub. No.: WO2019/139443
PCT Pub. Date: Jul. 18, 2019

(65) Prior Publication Data
US 2020/0403239 A1  Dec. 24, 2020

(30) Foreign Application Priority Data

Jan. 12, 2018  (KR) .......................... 10-2018-0004416

(51) Int. Cl.
*H01M 4/525* (2010.01)
*H01M 4/02* (2006.01)
(Continued)

(52) U.S. Cl.
CPC ........... *H01M 4/525* (2013.01); *H01M 4/382* (2013.01); *H01M 4/505* (2013.01);
(Continued)

(58) Field of Classification Search
CPC .............................. H01M 4/525; H01M 4/505
See application file for complete search history.

(56) References Cited

U.S. PATENT DOCUMENTS 6,998,069 B1 * 2/2006 Coluccia ............ C01G 45/1228
427/126.3
8,173,301 B2  5/2012 Hiratsuka et al.
(Continued)

FOREIGN PATENT DOCUMENTS

CN  101809788 A  8/2010
CN  104936902 A  9/2015
(Continued)

OTHER PUBLICATIONS

Christian M. Julien, et al., Comparative Issues of Cathode Materials for Li-Ion Batteries, Mar. 25, 2014, Inorganics, 2014(2), 132-154 (Year: 2014).*

(Continued)

*Primary Examiner* — Matthew T Martin
*Assistant Examiner* — Krishna R Hammond
(74) *Attorney, Agent, or Firm* — PnK IP LLC

(57) ABSTRACT

Provided is a positive active material in which a compound containing lithium, a transition metal, and oxygen is doped with a doping metal, the positive active material including lithium (Li) layers, in which the lithium layers may include a first lithium layer including only lithium and a second lithium layer in which at least a part of the lithium of the first lithium layer is substituted with a transition metal.

10 Claims, 34 Drawing Sheets

(51) Int. Cl.
*H01M 4/38* (2006.01)
*H01M 4/505* (2010.01)
*H01M 10/0525* (2010.01)

(52) U.S. Cl.
CPC .. *H01M 10/0525* (2013.01); *H01M 2004/027* (2013.01); *H01M 2004/028* (2013.01)

(56) References Cited

U.S. PATENT DOCUMENTS

| | | | |
|---|---|---|---|
| 10,109,853 B2 | 10/2018 | Sugie et al. | |
| 2006/0194114 A1* | 8/2006 | Saito | |
| 2013/0344386 A1 | 12/2013 | Kim et al. | |
| 2015/0147655 A1* | 5/2015 | Park | H01M 4/5825 429/231.1 |
| 2015/0214547 A1 | 7/2015 | Jordy et al. | |
| 2017/0155146 A1* | 6/2017 | Lee | C01G 53/50 |
| 2018/0175387 A1* | 6/2018 | Kim | H01M 4/134 |

FOREIGN PATENT DOCUMENTS

| | | | | |
|---|---|---|---|---|
| CN | 106129399 A | * | 11/2016 | ........ H01M 10/0525 |
| KR | 10-0728717 A | | 6/2007 | |
| KR | 10-2007-0109854 A | | 11/2007 | |
| KR | 10-0815583 B1 | | 3/2008 | |
| KR | 10-2013-0143427 A | | 12/2013 | |
| KR | 10-2014-0119621 A | | 10/2014 | |
| KR | 10-2015-0004034 A | | 1/2015 | |
| KR | 10-2015-0083834 A | | 7/2015 | |
| KR | 10-2015-0141254 A | | 12/2015 | |
| KR | 10-2016-0083616 A | | 7/2016 | |
| KR | 10-2016-0094063 A | | 8/2016 | |
| KR | 10-1656935 B1 | | 9/2016 | |
| KR | 10-2016-0128978 A | | 11/2016 | |

OTHER PUBLICATIONS

Y.S. Meng, et al., Cation Ordering in Layered O3 Li[NixLi1/3-2x/3Mn2/3-x/3]O2 (0 < x < 1/2) Compounds, Dec. 18, 2004, Advanced Materials for Micro & Nano-Systems (Singapore-MIT Alliance), 1-9 (Year: 2004).*
J.P. Peres, F. Weill, C. Delmas, Lithium/vacancy ordering in the monoclinic LixNiO2 (0.50≤x≤0.75) solid solution, Jan. 1999, Solid State Ionics, vol. 116, 19-27 (https://doi.org/10.1016/S0167-2738(98)00239-2) (Year: 1999).*
Ates, Mehmet Nurullah, et al., A high rate Li-rich layered MNC cathode material for lithium-ion batteries, Mar. 12, 2015, RSC Advances, 5(2015), 227375-27386, Electronic Supplemental Information. (Year: 2015).*
Yang-Kook, Sun, et al., Synthesis and Characterization of Li[(Ni0.8Co0.1Mn0.1)0.8(Ni0.5Mn0.5)0.2]O2 with the Microscale Core-Shell Structure as the Positive Electrode Material for Lithium Batteries, 2005, J. Am. Chem. Soc. (38) 127, 13411-13418, Abstract. (Year: 2005).*
M.E. Arroyo y de Dompablo, et al., Jahn-Teller mediated ordering in Layered LixMO2 compounds, 63 Physical Review B, Mar. 21, 2001). (Year: 2001).*
Aulbur, Wilfried G., Quasiparticle Calculations in Solids, Solid State Physics, 2000. (Year: 2000).*
Meng et al., Cation Ordering in Layered O3 Li[NixLi1/3-2x/3Mn2/3-x/3]O2 (0 < x < 1/2) of Materials, American Chemical Society, 2005.
Yoon, Chong S. et al. Cation Ordering of Zr-Doped LiNiO2 Cathode for Lithium-Ion Batteries. Chemistry of Materials. Feb. 14, 2018.
Peres, J.P. et al., "Lithium/vacancy ordering in the monoclinic LixNiO2(0.50≤x≤0.75) solid solution," Solid State Ionics, vol. 116, pp. 19-27 (1999).
Julien, C.M. et al., "Comparative Issues of Cathode Materials for Li-Ion Batteries," Inorganics, vol. 2, pp. 132-154 (2014).
CN Office Action dated Dec. 23, 2023 as received in Application No. 201980017019.8.

* cited by examiner

POSITIVE ACTIVE MATERIAL, METHOD OF PREPARING THE SAME, AND LITHIUM SECONDARY BATTERY INCLUDING THE SAME

CROSS-REFERENCE TO RELATED APPLICATION

This application is a continuation of pending International Application No. PCT/KR2019/000559, which was filed on Jan. 14, 2019 and claims priority to Korean Patent Application Nos. 10-2018-0004416 and 10-2019-0004863 filed on Jan. 12, 2018 and Jan. 14, 2019 in the Korean Intellectual Property Office, the disclosures of which are hereby incorporated by reference in their entireties.

TECHNICAL FIELD

The present application relates to a positive active material, a method of preparing the same, and a lithium secondary battery including the same, and more particularly, to a positive active material in which zirconium is doped, a method of preparing the same, and a lithium secondary battery including the same.

BACKGROUND ART

With the development of portable mobile electron devices, such as a smart phone, an MP3 player, and a tablet PC, the demand for secondary batteries capable of storing electric energy is explosively increasing. Particularly, with the advent of electric vehicles, medium and large energy storing systems, and portable devices requiring high energy density, the demand for lithium secondary batteries is increasing.

As such, the demand for the lithium secondary batteries increases, so that research and development of positive active materials used in the lithium secondary batteries is in progress. For example, Korean Patent Application Publication No. 10-2014-0119621 (Application No. 10-2013-0150315) discloses a secondary battery, in which the kind and a composition of metal substituted in a precursor are adjusted by using the precursor for preparing a positive active material including the excessive amount of lithium and adjusting the kind and the amount of metal added to exhibit high-voltage capacity and long life characteristics.

DISCLOSURE

Technical Problem

An technical object to be solved by the present application is to provide a high-capacity positive active material, a method of preparing the same, and a lithium secondary battery including the same.

Another technical object to be solved by the present application is to provide a positive active material having long life, a method of preparing the same, and a lithium secondary battery including the same.

Another technical object to be solved by the present application is to provide a high-stable positive active material, a method of preparing the same, and a lithium secondary battery including the same.

Another technical object to be solved by the present application is to provide a positive active material in which a life shortening characteristic according to the number of times of charge/discharge is minimized, a method of preparing the same, and a lithium secondary battery including the same.

The technical objects to be solved by the present application are not limited to the foregoing.

Technical Solution

In order to solve the technical problem, the present application provides a positive active material.

According to an exemplary embodiment, the positive active material in which a compound containing lithium, a transition metal, and oxygen is doped with a doping metal includes lithium (Li) layers, in which the lithium layers may include a first lithium layer including only lithium and a second lithium layer in which at least a part of the lithium of the first lithium layer is substituted with a transition metal.

According to the exemplary embodiment, substitution energy of the lithium and the transition metal may be decreased by the doping metal, so that a part of the lithium of the first lithium layer may be substituted with the transition metal.

According to the exemplary embodiment, the first lithium layer and the second lithium layer may be alternately and repeatedly arranged.

According to the exemplary embodiment, the doping metal may include at least one of zirconium, boron, titanium, and tungsten.

According to the exemplary embodiment, the doping metal may include zirconium, and zirconium may be less than 2 mol %.

According to the exemplary embodiment, the transition metal may be nickel, and a concentration of nickel may be 79 mol % or more.

According to the exemplary embodiment, a superlattice may be provided by the second lithium layer in which at least the part of the lithium of the first lithium layer is substituted with the transition metal.

According to the exemplary embodiment, in the second lithium layer, a half of the lithium of the first lithium layer may be substituted with the transition metal.

According to the exemplary embodiment, the positive active material may include a first lithium layer in which lithium is regularly arranged, and a second lithium layer in which lithium and a transition metal are regularly arranged, in which a superlattice may be formed by the first lithium layer and the lithium and the transition metal included in the first lithium layer.

According to the exemplary embodiment, the superlattice may include six lithium atoms and one transition metal element.

According to the exemplary embodiment, the lithium and the transition metal may be alternately arranged in the second lithium layer, and the first lithium layer and the second lithium layer may be alternately arranged.

According to the exemplary embodiment, the second lithium layer may be identified with an electron diffraction pattern in zone.

In order to solve the technical problem, the present invention provides a method of preparing a positive active material.

According to an exemplary embodiment, the method may include: preparing a positive active material precursor including a hydroxide including a transition metal and a doping metal by using a transition metal precursor and a doping metal precursor; and preparing a positive active material in which a compound containing lithium, the transition metal, and oxygen is doped with the doping metal by mixing and calcining the positive active material precursor and lithium salt, in which the doping metal in the positive active material precursor may be less than 2 mol %.

According to the exemplary embodiment, the doping metal may include at least one of zirconium, boron, titanium, and tungsten.

In order to solve the technical problem, the present invention provides a positive active material including lithium, a transition metal, and oxygen, and including lithium (Li) layers and transition metal layers, in which the lithium layers include a first lithium layer including only lithium and a second lithium layer in which at least a part of the lithium of the first lithium layer is alternately substituted with the transition metal, the transition metal layer includes a first transition metal layer including only the transition metal, and a second transition metal layer in which at least a part of the first transition metal layer is alternately substituted with lithium, and the second lithium layers and the second transition metal layers are alternately and repeatedly provided.

According to an exemplary embodiment, an a-axis of a lattice formed by the second lithium layer and the second transition metal layer may include a lattice with long range ordering.

According to the exemplary embodiment, a lattice formed by the second lithium layer and the second transition metal layer may include a superlattice whose a-axis length is two times an a-axis length of a lattice formed by the first lithium layer and the first transition metal layer.

According to the exemplary embodiment, wherein the first lithium layers and the first transition metal layers may be alternately and regularly arranged, and the second lithium layers and the second transition metal layers may be alternately and regularly arranged, and a lattice formed by the second lithium layers and the second transition metal layers may include a superlattice.

According to the exemplary embodiment, in the second lithium layer, a half of the lithium of the first lithium layer may be substituted with the transition metal, in the second transition metal layer, a half of the transition metal of the first transition metal layer may be substituted with lithium, and the transition metal of the second lithium layer may be obtained through an exchange of the transition metal of the first transition metal layer and the lithium of the second lithium layer, so that the lithium and the transition metal of the second lithium layer may be alternately and repeatedly arranged, and the transition metal and the lithium of the second transition metal layer may be alternately and repeatedly provided while corresponding to the lithium and the transition metal of the second lithium layer, respectively.

According to the exemplary embodiment, the positive active material may further include a doping metal, in which substitution energy of the lithium and the transition metal may decrease by the doping metal, so that a part of the lithium of the first lithium layer may be substituted with a transition metal to form the second lithium layer, and a part of the transition metal of the first transition metal may be substituted with lithium to form a second transition metal layer.

According to the exemplary embodiment, the doping metal may include at least one of zirconium, boron, titanium, aluminum, and tungsten.

According to the exemplary embodiment, the transition metal may include one or more of nickel, cobalt, and manganese, and a concentration of at least one of nickel, cobalt, and manganese in the positive active material may have a concentration gradient in at least a part of the positive active material in a direction from a center to a surface of the positive active material.

In order to solve the technical problem, the present invention provides a positive active material, including: a first lithium layer in which lithium is regularly arranged; and a second lithium layer in which lithium and a transition metal are regularly arranged; a first transition metal layer in which the transition metal is regularly arranged; and a second transition metal layer in which the transition metal and lithium are regularly arranged, in which the second lithium layer and the second transition metal layer are alternately provided, and as a result of an electron diffraction pattern fora zone axis or a zone axis, a first diffraction spot group which corresponds to a lattice formed by the first lithium layer and the first transition metal layer and is formed by aligning one or more diffraction spots having relatively high strength in one direction, and a second diffraction spot group which corresponds to a lattice formed by the second lithium layer and the second transition metal layer and is formed by aligning one or more diffraction spots having relatively lower strength than the strength of the diffraction spot included in the first diffraction spot group in one direction.

According to the exemplary embodiment, in the second lithium layer, the lithium and the transition metal may be alternately arranged, in the second transition metal layer, the transition metal and the lithium may be alternately arranged, a lattice formed by the second lithium layer and the second transition metal layer may include a superlattice, and the superlattice may include six lithium elements and one transition metal element.

According to the exemplary embodiment, the first diffraction spot group and the second diffraction spot group may be alternately and regularly arranged, and the first diffraction spot group and the second diffraction spot group may be provided while being spaced apart from each other at the same interval.

Advantageous Effects

According to the exemplary embodiments, the positive active material in which a compound containing lithium, a transition metal, and oxygen is doped with a doping metal includes lithium (Li) layers, in which the lithium layers may include a first lithium layer including only lithium and a second lithium layer in which at least a part of the lithium of the first lithium layer is substituted with a transition metal.

A superlattice may be formed by the first lithium layer and the lithium and the transition metal included in the second lithium layer, thereby providing the positive active material in which a life shortening characteristic is minimized in a high-nickel positive active material.

BEST MODE

Figure 1:
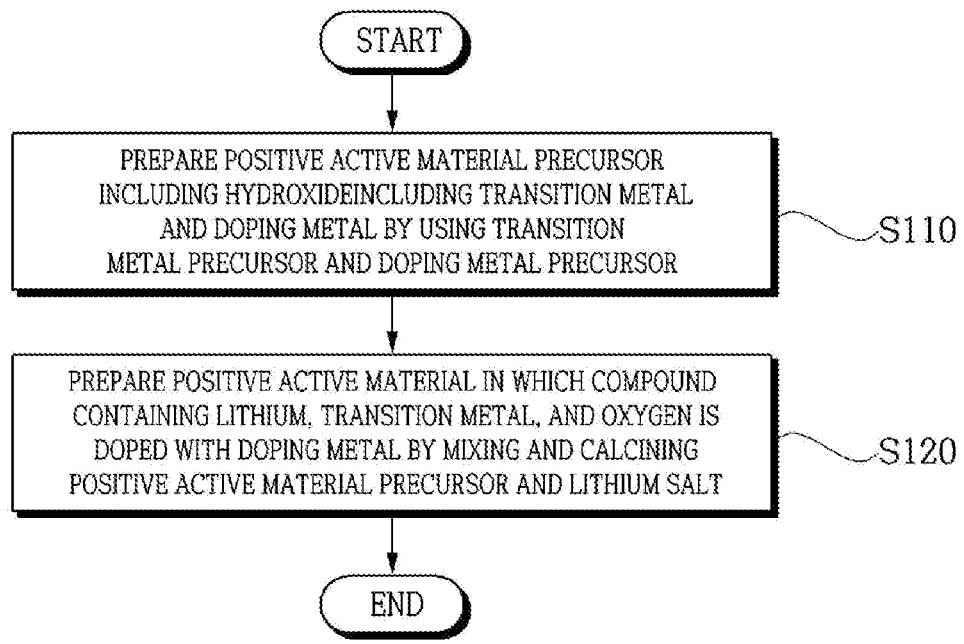
FIG. 1 is a flowchart for describing a method of preparing a positive active material according to an exemplary embodiment of the present invention.

Hereinafter, the exemplary embodiments of the present invention will be described with reference to the accompanying drawings. However, the technical spirit of the present invention is not limited to the exemplary embodiments described herein, but may also be implemented in other forms. Rather, the embodiments introduced herein are provided so as to make the disclosed contents be thorough and complete and to fully transfer the spirit of the present invention to those skilled in the art.

In the present specification, when it is said that one constituent element is formed on another constituent element, the constituent element may be directly formed on another constituent element, or may be formed on the another constituent element with a third constituent element interposed therebetween. Further, in the drawings, thicknesses of layers and regions are exaggerated for the effective description of the technical contents.

Further, in the various exemplary embodiments of the present specification, although terms, such as "a first", "a second", and "a third", are used for describing various constituent elements, but the constituent elements are not limited by the terms. The terms are simply used for discriminating one constituent element from another constituent element. Accordingly, a first constituent element mentioned in any one exemplary embodiment may also be mentioned as a second constituent element in another exemplary embodiment. Each exemplary embodiment described and exemplified herein also includes a complementary exemplary embodiment thereof. Further, in the present specification, the term "and/or" is used as a meaning including at least one among the constituent elements listed before and after.

Singular expressions used herein include plurals expressions unless they have definitely opposite meanings in the context. It will be appreciated that terms "including" and "having" are intended to designate the existence of characteristics, numbers, steps, constituent elements, and a combination thereof described in the specification, and do not exclude a possibility of the existence or addition of one or more other characteristics, numbers, steps, constituent elements, or a combination thereof.

Further, in the following description of the present invention, when a detailed description of a related publicly known function or configuration is determined to unnecessarily make the subject matter of the present invention unclear, the detailed description thereof will be omitted.

Further, in the specification of the present application, a crystal system may consist of seven systems including a triclinic system, a monoclinic system, an orthorhombic system, a tetragonal system, a trigonal or rhombohedral system, a hexagonal system, and a cubic system.

Further, in the specification of the present application, "mol %" is interpreted to mean the content of predetermined element included in a positive active material or a positive active material precursor when it is assumed that the sum of remaining elements excluding lithium, oxygen, and hydrogen in the positive active material or the positive active material precursor is 100%.

Figure 2:
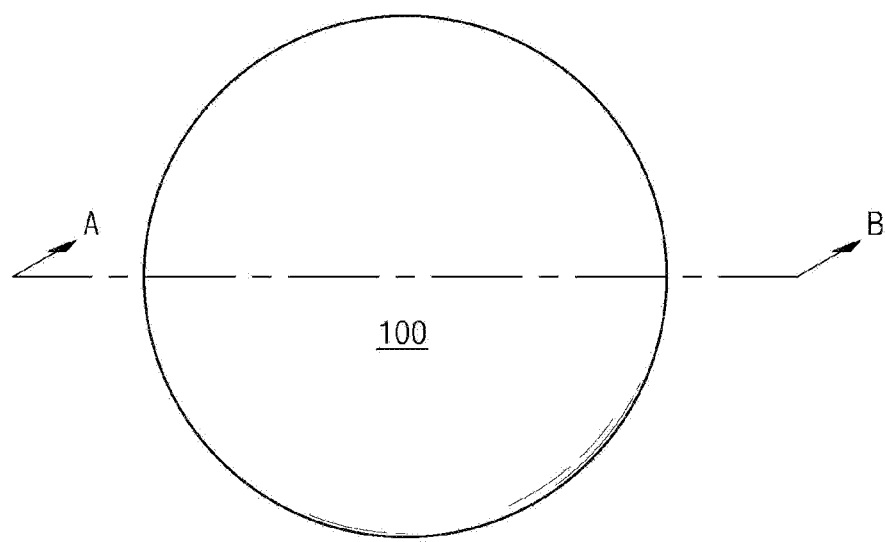
FIG. 2 is a diagram for describing a positive active material according to an exemplary embodiment of the present invention.
Figure 3:
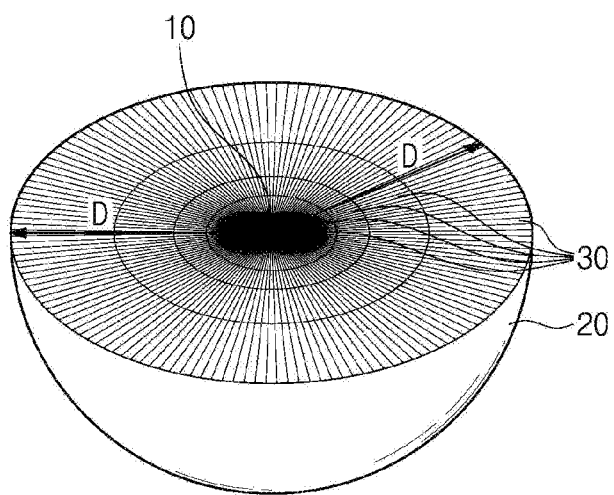
FIG. 3 is a diagram taken along line A-B of FIG. 2.

FIG. 1 is a flowchart for describing a method of preparing a positive active material according to an exemplary embodiment of the present invention, FIG. 2 is a diagram for describing a positive active material according to an exemplary embodiment of the present invention, and FIG. 3 is a diagram taken along line A-B of FIG. 2.

Referring to FIGS. 1 to 3, an exemplary embodiment of the present invention relates to a positive active material 100 including lithium, a transition metal, and oxygen, and including lithium (Li) layers and transition metal layers, in which the lithium layers include a first lithium layer including only lithium and a second lithium layer in which at least a part of the lithium of the first lithium layer is alternately substituted with the transition metal, the transition metal layer includes a first transition metal layer including only the transition metal, and a second transition metal layer in which at least a part of the first transition metal layer is alternately substituted with lithium, and the second lithium layers and the second transition metal layers are alternately and repeatedly provided. Further, an a-axis of a lattice formed by the second lithium layer and the second transition metal layer may include a lattice with long range ordering. A lattice formed by the second lithium layer and the second transition metal layer may include a superlattice whose a-axis length is two times an a-axis length of a lattice formed by the first lithium layer and the first transition metal layer. The first lithium layers and the first transition metal layers may be alternately and regularly arranged, and the second lithium layers and the second transition metal layers may be alternately and regularly arranged, and a lattice formed by the second lithium layers and the second transition metal layers may include a superlattice.

Another exemplary embodiment of the present invention relates to a positive active material 100 according to the exemplary embodiment of the present invention may include a material in which a compound containing nickel, lithium, and oxygen is doped with a doping metal. For example, the positive active material 100 may be the material in which a compound of lithium, nickel, and oxygen is doped with a doping metal, the material in which a compound of lithium, nickel, cobalt, and oxygen is doped with a doping metal, the material in which a compound of lithium, nickel, cobalt, manganese, and oxygen is doped with a doping metal, and or the material in which a compound of lithium, nickel, cobalt, aluminum, and oxygen is doped with a doping metal.

For example, the doping metal may include at least one of zirconium, boron, titanium, and tungsten. Further, when the doping metal is zirconium, a concentration of zirconium in the positive active material 100 may be less than 2 mol %. Accordingly, a charge/discharge characteristic and a life characteristic of a lithium secondary battery including the positive active material 100 may be improved. In contrast, when a concentration of zirconium is 2 mol % or more, a charge/discharge characteristic and a life characteristic of a lithium secondary battery may deteriorate.

According to an exemplary embodiment, a concentration of at least one of nickel, cobalt, manganese, and aluminum may be substantially constant in the positive active material 100. Otherwise, according to another exemplary embodiment, a concentration of at least one of nickel, cobalt, manganese, and aluminum in the positive active material 100 may have, from a center of a particle to a surface of the particle, a concentration gradient in the entire particle or a concentration gradient in a part of the particle. Otherwise, according to another exemplary embodiment, the positive active material 100 may include a core portion and a shell portion having a different concentration of metal (at least one of nickel, cobalt, manganese, and aluminum) from that of the core portion. The technical spirit according to the exemplary embodiment of the present invention may be applied to the positive active materials having various structures and forms.

The positive active material may include primary particles 30 and a secondary particle in which the primary particles 30 are agglomerated. The primary particles 30 may be extended in a direction in which the primary particles 30 are radiated from one region of an inner portion of the secondary particle to a surface portion 20 of the secondary particle. The one region in the inner portion of the secondary particle may be a center portion 10 of the secondary particle. That is, the primary particle 30 may have a rod shape extended from the one region of the inner portion of the secondary particle to the surface portion 20 of the secondary particle.

According to the exemplary embodiment, the primary particle 30 relatively adjacent to the surface portion 20 of the secondary particle may have a longer length in a direction from the center portion 10 of the inner portion of the secondary particle to the surface portion 20 of the secondary particle than the primary particle 30 relatively adjacent to the center portion 10 of the inner portion of the secondary particle. That is, in at least a part of the secondary particle extended from the center portion 10 to the surface portion 20 of the secondary particle, the lengths of the primary particles 30 may increase as the primary particles 30 are adjacent to the surface portion 20 of the secondary particle.

An a-axis of a crystal structure of the primary particle 30 may be arranged to be parallel to the direction from the center portion 10 to the surface portion 20 of the secondary particle. Accordingly, a movement path of metal ions (for example, lithium ions) and an electrolyte may be provided between the spaces between the primary particles 30 having the rod shapes, that is, the spaces between the primary particles 30 extended in a direction D from the center portion 10 to the surface portion 20 of the secondary particle. Accordingly, charge/discharge efficiency of a secondary battery including the positive active material according to the exemplary embodiment of the present invention may be improved.

The positive active material 100 may be the compound containing lithium, a transition metal, and oxygen, or the material in which the compound is doped with the doping metal as described above. In this case, the positive active material 100 may include lithium (Li) layers, and the lithium layers may include a first lithium layer and a second lithium layer. The first lithium layer may be a layer including only a lithium atom in an atomic arrangement structure of the positive active material 100, and the second lithium layer may be provided by substituting at least a part of the lithium of the first lithium layer with the transition metal. That is, by the doping of the doping metal, substitution energy of the lithium and the transition metal is decreased, and thus a part of the lithium of some first lithium layers in the plurality of first lithium layers is substituted with the transition metal, so that the second lithium layer may be provided.

The first lithium layer may be a fully Li-occupied layer in which only lithium is regularly arranged, and the second lithium layer may be a half Li-occupied layer in which a half of lithium is substituted with the transition metal in the first lithium layer, and lithium and the transition metal may be regularly arranged.

The first lithium layer and the second lithium layer are alternately and repeatedly arranged, so that a superlattice may be formed by the first lithium layer and the lithium and the transition metal included in the first lithium layer. The superlattice may be formed of six lithium atoms and one transition metal element. The positive active material 100 may further include transition metal layers together with the lithium layers, and the transition metal layer may include a first lithium layer including only lithium and a second lithium layer in which at least a part of the lithium of the first lithium layer is alternately substituted with the transition metal, the transition metal layer includes a first transition metal layer including only the transition metal, and a second transition metal layer in which at least a part of the first transition metal layer is alternately substituted with lithium, and the second lithium layers and the second transition metal layers are alternately and repeatedly provided. The first lithium layers and the first transition metal layers may be alternately and regularly arranged, and the second lithium layers and the second transition metal layers may be alternately and regularly arranged, and a lattice formed by the second lithium layers and the second transition metal layers may include a superlattice. Further, in the second lithium layer, a half of the lithium of the first lithium layer is substituted with the transition metal, and in the second transition metal layer, a half of the transition metal of the first transition metal layer may be substituted with lithium. The transition metal of the second lithium layer may be obtained through an exchange of the transition metal of the first transition metal layer and the lithium of the second lithium layer, so that the lithium and the transition metal of the second lithium layer may be alternately and repeatedly arranged, and the transition metal and the lithium of the second transition metal layer may be alternately and repeatedly provided while corresponding to the lithium and the transition metal of the second lithium layer, respectively.

The positive active material may further include a doping metal, and substitution energy of the lithium and the transition metal may decrease by the doping metal, so that a part of the lithium of the first lithium layer may be substituted with a transition metal to form the second lithium layer, and a part of the transition metal of the first transition metal layer may be substituted with lithium to form a second transition metal layer.

As described above, when the part of the lithium of the pure lithium layer is substituted with the transition metal and an anti-site is generated, the electrolyte may permeate into a crack generated during the charge/discharge process of the positive active material 100, and a rock-salt structure may be generated on a surface of the positive active material 100 by a parasitic reaction of the electrolyte permeating into the crack. The rock-salt structure has an inactive characteristic and increases charge movement resistance, thereby degrading a charge/discharge capacity and a life characteristic.

However, according to the exemplary embodiment of the present invention, the positive active material 100 may include nickel of a high concentration (for example, 79.5 mol % or more), and thus even though the charge/discharge progresses, the rock-salt structure does not grow thick and may maintain a constant thickness. Accordingly, even though the anti-site is generated by the doping of the doping metal, a life characteristic may be improved without degradation of a charge/discharge capacity.

Subsequently, the method of preparing the positive active material according to the exemplary embodiment of the present invention will be described with reference to FIGS. 1 and 2.

Referring to FIG. 1, a positive active material precursor having a hydroxide including a transition metal and a doping metal is prepared by using a transition metal precursor and a doping metal precursor (S110). The transition metal precursor may include at least one of nickel sulfate, cobalt sulfate, and manganese sulfate, and the doping metal precursor may include an aqueous solution in which zirconium sulfate, titanium sulfate, and tungsten is resolved, and the like.

For example, the positive active material precursor may be expressed by Chemical Formula 2 below.

<Chemical Formula 2>

[M1$_x$M2$_y$](OH)$_2$

In Chemical Formula 2, $0.795 \leq x < 1.00$ and $0 < y < 0.02$, and M1 includes at least one of nickel, cobalt, and manganese, and M2 may be a doping metal.

A positive active material, in which a compound containing lithium, the transition metal, and oxygen is doped with the doping metal, may be prepared by mixing and calcining the positive active material precursor and lithium salt (S120).

According to the exemplary embodiment, when the positive active material further includes aluminum, the preparing of the positive active material may include mixing and calcining the positive active material precursor, lithium salt, and an aluminum precursor.

Hereinafter, the particular method of preparing the positive active material according to the exemplary embodiment of the present invention and a characteristic evaluation result will be described.

Prepare Positive Active Material According to Comparative Example 1 (Ni 100)

Distilled water was added to a co-precipitation reactor and then stirred while N$_2$ gas was supplied to a reactor. A nickel sulfate metal aqueous solution and an ammonia solution were continuously added to the reactor. Further, a sodium hydroxide solution was supplied for pH adjustment to prepare a Ni(OH)$_2$ metal composite hydroxide.

The prepared Ni(OH)$_2$ metal composite hydroxide was washed with water, filtered, and then dried in a vacuum drier at 110° C. The metal composite hydroxide and a lithium hydroxide (LiOH) were mixed at a molar ratio of 1:1.01 and then calcined at 650° C. in an oxygen atmosphere to prepare LiNiO$_2$ positive active material powder.

Prepare positive active material according to Example 1-1 (Ni 99.5 Zr 0.5)

Distilled water was added to a co-precipitation reactor and then stirred while N$_2$ gas was supplied to the reactor. A metal aqueous solution, in which a molar ratio of nickel sulfate and zirconium sulfate is 99.5:0.5, and an ammonia solution were continuously added to the reactor. Further, a sodium hydroxide solution was supplied for pH adjustment to prepare a [Ni$_{0.995}$Zr$_{0.005}$](OH)$_2$ metal composite hydroxide.

The prepared [Ni$_{0.995}$Zr$_{0.005}$](OH)$_2$ metal composite hydroxide was washed with water, filtered, and then dried at a vacuum drier at 110° C. The metal composite hydroxide and a lithium hydroxide (LiOH) were mixed at a molar ratio of 1:1.01 and then calcined at 650° C. in an oxygen atmosphere to prepare Li [Ni$_{0.995}$Zr$_{0.005}$]O$_2$ positive active material powder.

Prepare positive active material according to Example 1-2 (Ni 99 Zr 1)

Distilled water was added to a co-precipitation reactor and then stirred while N$_2$ gas was supplied to the reactor. A metal aqueous solution, in which a molar ratio of nickel sulfate and zirconium sulfate is 99:1, and an ammonia solution were continuously added to the reactor. Further, a sodium hydroxide solution was supplied for pH adjustment to prepare a [Ni$_{0.99}$Zr$_{0.01}$](OH)$_2$ metal composite hydroxide.

The prepared [Ni$_{0.99}$Zr$_{0.01}$](OH)$_2$ metal composite hydroxide was washed with water, filtered, and then dried at a vacuum drier at 110° C. The metal composite hydroxide and a lithium hydroxide (LiOH) were mixed at a molar ratio of 1:1.01 and then calcined at 650° C. in an oxygen atmosphere to prepare Li [Ni$_{0.99}$Zr$_{0.01}$]O$_2$ positive active material powder.

Prepare positive active material according to Example 1-3 (Ni 98 Zr 2)

Distilled water was added to a co-precipitation reactor and then stirred while N$_2$ gas was supplied to the reactor. A metal aqueous solution, in which a molar ratio of nickel sulfate and zirconium sulfate is 98:2, and an ammonia solution were continuously added to the reactor. Further, a sodium hydroxide solution was supplied for pH adjustment to prepare a [Ni$_{0.98}$Zr$_{0.02}$](OH)$_2$ metal composite hydroxide.

The prepared [Ni$_{0.98}$Zr$_{0.02}$](OH)$_2$ metal composite hydroxide was washed with water, filtered, and then dried at a vacuum drier at 110° C. The metal composite hydroxide and a lithium hydroxide (LiOH) were mixed at a molar ratio of 1:1.01 and then calcined at 650° C. in an oxygen atmosphere to prepare Li [Ni$_{0.98}$Zr$_{0.02}$]O$_2$ positive active material powder.

Prepare positive active material according to Example 2 (Ni 99.5 Ti 0.5)

Distilled water was added to a co-precipitation reactor and then stirred while N$_2$ gas was supplied. A metal aqueous solution, in which a molar ratio of nickel sulfate and titanium sulfate is 99.5:0.5, and an ammonia solution were continuously added. Further, a sodium hydroxide solution was supplied for pH adjustment to prepare a [Ni$_{0.995}$Ti$_{0.005}$](OH)$_2$ metal composite hydroxide.

The prepared [Ni$_{0.995}$Ti$_{0.005}$](OH)$_2$ metal composite hydroxide was washed with water, filtered, and then dried at a vacuum drier at 110° C. The metal composite hydroxide and a lithium hydroxide (LiOH) were mixed at a molar ratio of 1:1.01 and then calcined at 650° C. in an oxygen atmosphere to prepare Li [Ni$_{0.995}$Ti$_{0.005}$]O$_2$ positive active material powder.

Prepare Positive Active Material According to Comparative Example 3 (Ni 90 Co 10)

Distilled water was added to a co-precipitation reactor and then stirred while N$_2$ gas was supplied to the reactor. A metal aqueous solution, in which a molar ratio of nickel sulfate and cobalt sulfate is 90:10, and an ammonia solution were continuously added to the reactor. Further, a sodium hydroxide solution was supplied for pH adjustment to prepare a [Ni$_{0.90}$Co$_{0.10}$](OH)$_2$ metal composite hydroxide.

The prepared [Ni$_{0.90}$Co$_{0.10}$](OH)$_2$ metal composite hydroxide was washed with water, filtered, and then dried at a vacuum drier at 110° C. The metal composite hydroxide and a lithium hydroxide (LiOH) were mixed at a molar ratio of 1:1.01 and then calcined at 700° C. in an oxygen atmosphere to prepare Li [Ni$_{0.90}$Co$_{0.10}$]O$_2$ positive active material powder.

Prepare positive active material according to Example 3 (Ni 89 Co 10 W 1)

$WO_3$ powder was dissolved in a lithium hydroxide solution at a concentration of 0.47 M. A basic aqueous solution, in which W was dissolved, was prepared by dissolving the prepared solution in a sodium hydroxide solution. Distilled water was added to a co-precipitation reactor and then stirred while $N_2$ gas was supplied to the reactor. A metal aqueous solution, in which a molar ratio of nickel sulfate and cobalt sulfate is 90:10, and an ammonia solution were continuously added to the reactor. Further, the basic aqueous solution, in which W was dissolved, was supplied for pH adjustment and the addition of tungsten to prepare a $[Ni_{0.89}Co_{0.10}W_{0.01}](OH)_2$ metal composite hydroxide.

The prepared $[Ni_{0.89}Co_{0.10}W_{0.01}](OH)_2$ metal composite hydroxide was washed with water, filtered, and then dried at a vacuum drier at 110° C. for 12 hours. The metal composite hydroxide and a lithium hydroxide (LiOH) were mixed at a molar ratio of 1:1.01 and then calcined at 750° C. in an oxygen atmosphere to obtain Li $[Ni_{0.89}Co_{0.10}W_{0.01}]O_2$ positive active material powder.

Prepare Positive Active Material According to Comparative Example 4 (Ni 94 Co 3 Mn 3)

Distilled water was added to a co-precipitation reactor and then stirred while $N_2$ gas was supplied to the reactor. A metal aqueous solution, in which a molar ratio of nickel sulfate, cobalt sulfate, and manganese sulfate is 94:3:3, and an ammonia solution were continuously added to the reactor. Further, a sodium hydroxide solution was supplied for pH adjustment to prepare a $[Ni_{0.94}Co_{0.03}Mn_{0.03}](OH)_2$ metal composite hydroxide.

The prepared $[Ni_{0.94}Co_{0.03}Mn_{0.03}](OH)_2$ metal composite hydroxide was washed with water, filtered, and then dried at a vacuum drier at 110° C. The metal composite hydroxide and a lithium hydroxide (LiOH) were mixed at a molar ratio of 1:1.01 and then calcined at 700° C. in an oxygen atmosphere to prepare Li $[Ni_{0.94}Co_{0.03}Mn_{0.03}]O_2$ positive active material powder.

Prepare Positive Active Material According to Example 4 (Ni 93 Co 3 Mn 3 W 1)

$WO_3$ powder was dissolved in a lithium hydroxide solution at a concentration of 0.47 M. A basic aqueous solution, in which W was dissolved, was prepared by dissolving the prepared solution in a sodium hydroxide solution. Distilled water was added to a co-precipitation reactor and then stirred while $N_2$ gas was supplied to the reactor. A metal aqueous solution, in which a molar ratio of nickel sulfate, cobalt sulfate, and manganese sulfate is 94:3:3, and an ammonia solution were continuously added to the reactor. Further, the basic aqueous solution, in which W was dissolved, was supplied for pH adjustment and the addition of tungsten to prepare a $[Ni_{0.93}Co_{0.03}Mn_{0.03}W_{0.01}](OH)_2$ metal composite hydroxide.

The prepared $[Ni_{0.93}Co_{0.03}Mn_{0.03}W_{0.01}](OH)_2$ metal composite hydroxide was washed with water, filtered, and then dried at a vacuum drier at 110° C. for 12 hours. The metal composite hydroxide and a lithium hydroxide (LiOH) were mixed at a molar ratio of 1:1.01 and then calcined at 780° C. in an oxygen atmosphere to obtain Li $[Ni_{0.93}Co_{0.03}Mn_{0.03}W_{0.01}]O_2$ positive active material powder.

Prepare Positive Active Material According to Comparative Example 5 (Ni 80 Co 10 Mn 10)

Distilled water was added to a co-precipitation reactor and then stirred while $N_2$ gas was supplied to the reactor. A metal aqueous solution, in which a molar ratio of nickel sulfate, cobalt sulfate, and manganese sulfate is 80:10:10, and an ammonia solution were continuously added to a reactor. Further, a sodium hydroxide solution was supplied for pH adjustment to prepare a $[Ni_{0.80}Co_{0.10}Mn_{0.10}](OH)_2$ metal composite hydroxide.

The prepared $[Ni_{0.80}Co_{0.10}Mn_{0.10}](OH)_2$ metal composite hydroxide was washed with water, filtered, and then dried at a vacuum drier at 110° C. The metal composite hydroxide and a lithium hydroxide (LiOH) were mixed at a molar ratio of 1:1.01 and then calcined at 770° C. in an oxygen atmosphere to prepare Li $[Ni_{0.80}Co_{0.10}Mn_{0.10}]O_2$ positive active material powder.

Prepare Positive Active Material According to Example 5 (Ni 79 Co 10 Mn 10 W 1)

$WO_3$ powder was dissolved in a lithium hydroxide solution at a concentration of 0.47 M. A metal aqueous solution, in which W was dissolved, was prepared by dissolving the prepared solution in a sodium hydroxide solution. Distilled water was added to a co-precipitation reactor and then stirred while $N_2$ gas was supplied to the reactor. A metal aqueous solution, in which a molar ratio of nickel sulfate, cobalt sulfate, and manganese sulfate is 80:10:10, and an ammonia solution were continuously added to the reactor. Further, the metal aqueous solution, in which W was dissolved, was supplied for pH adjustment and the addition of tungsten to prepare a $[Ni_{0.79}Co_{0.10}Mn_{0.10}W_{0.01}](OH)_2$ metal composite hydroxide.

The prepared $[Ni_{0.79}Co_{0.10}Mn_{0.10}W_{0.01}](OH)_2$ metal composite hydroxide was washed with water, filtered, and then dried at a vacuum drier at 110° C. for 12 hours. The metal composite hydroxide and a lithium hydroxide (LiOH) were mixed at a molar ratio of 1:1.01 and then calcined at 790° C. in an oxygen atmosphere to obtain Li $[Ni_{0.79}Co_{0.10}Mn_{0.10}W_{0.01}]O_2$ positive active material powder.

Prepare Positive Active Material According to Comparative Example 5 (Ni 90 Co 5 Mn 5)

Distilled water was added to a co-precipitation reactor and then stirred while $N_2$ gas was supplied to the reactor. A metal aqueous solution, in which a molar ratio of nickel sulfate, cobalt sulfate, and manganese sulfate is 90:5:5, and an ammonia solution were continuously added to the reactor. Further, a sodium hydroxide solution was supplied for pH adjustment to prepare a $[Ni_{0.90}Co_{0.05}Mn_{0.05}](OH)_2$ metal composite hydroxide.

The prepared $[Ni_{0.90}Co_{0.05}Mn_{0.05}](OH)_2$ metal composite hydroxide was washed with water, filtered, and then dried at a vacuum drier at 110° C. The metal composite hydroxide and a lithium hydroxide (LiOH) were mixed at a molar ratio of 1:1.01 and then calcined at 750° C. in an oxygen atmosphere to prepare Li $[Ni_{0.90}Co_{0.05}Mn_{0.05}]O_2$ positive active material powder.

Prepare Positive Active Material According to Example 6 (Ni 89 Co 5 Mn 5 Al 1)

Distilled water was added to a co-precipitation reactor and then stirred while $N_2$ gas was supplied to the reactor. A first metal aqueous solution, in which a molar ratio of nickel sulfate and cobalt sulfate is 98:2, and an ammonia solution were continuously added to the reactor. Further, a sodium hydroxide solution was supplied for pH adjustment. Subsequently, the first metal aqueous solution was replaced with a second metal aqueous solution, in which a molar ratio of nickel sulfate, cobalt sulfate, and manganese sulfate is 80:9:11, and supplied to the reactor. Through the reaction, a CSG NC-NCM $[Ni_{0.90}Co_{0.05}Mn_{0.05}](OH)_2$ metal composite hydroxide was prepared.

The prepared CSG NC-NCM $[Ni_{0.90}Co_{0.05}Mn_{0.05}](OH)_2$ metal composite hydroxide was washed with water, filtered, and then dried at a vacuum drier at 110° C. The metal composite hydroxide, an aluminum hydroxide $(Al(OH)_3)$, and a lithium hydroxide (LiOH) were mixed at a molar ratio of 1:1.01 and then calcined at 740° C. in an oxygen atmosphere to prepare CSG NCA-NCMA Li $[Ni_{0.89}Co_{0.05}Mn_{0.05}Al_{0.01}]O_2$ positive active material powder.

Prepare Positive Active Material According to Example 7 (Ni 89 Co 5 Mn 5 B 1)

Distilled water was added to a co-precipitation reactor and then stirred while $N_2$ gas was supplied. A metal aqueous solution, in which a molar ratio of nickel sulfate, cobalt sulfate, and manganese sulfate is 90:5:5, and an ammonia solution were continuously added to the reactor. Further, a sodium hydroxide solution was supplied for pH adjustment to prepare a $[Ni_{0.90}Co_{0.05}Mn_{0.05}](OH)_2$ metal composite hydroxide.

The prepared $[Ni_{0.90}Co_{0.05}Mn_{0.05}](OH)_2$ metal composite hydroxide was washed with water, filtered, and then dried at a vacuum drier at 110° C. The metal composite hydroxide, a boron oxide $(B_2O_3)$, and a lithium hydroxide (LiOH) were mixed at a molar ratio of 0.99:0.005:1.01 and then calcined at 750° C. in an oxygen atmosphere to prepare Li $[Ni_{0.89}Co_{0.05}Mn_{0.05}B_{0.01}]O_2$ positive active material powder.

The compositions (mol %) of the positive active materials according to the Comparative Examples and the Examples of the present invention are organized as represented in the Table below.

TABLE 1

|  | Ni | Co | Mn | Doping metal |
|---|---|---|---|---|
| Comparative Example 1 | 100 | — | — | — |
| Example 1-1 | 99.5 | — | — | Zr 0.5 |
| Example 1-2 | 99 | — | — | Zr 1 |
| Example 1-3 | 98 | — | — | Zr 2 |
| Example 2 | 99.5 | — | — | Ti 0.5 |
| Comparative Example 3 | 90 | 10 | — | — |
| Example 3 | 89 | 10 | — | W 1 |
| Comparative Example 4 | 94 | 3 | 3 | — |
| Example 4 | 93 | 3 | 3 | W 1 |
| Comparative Example 5 | 80 | 10 | 10 | — |
| Example 5 | 79 | 10 | 10 | W 1 |
| Comparative Example 6 | 90 | 5 | 5 | — |
| Example 6 | 89 | 5 | 5 | Al 1 |
| Example 7 | 89 | 5 | 5 | B 1 |

Figure 4:
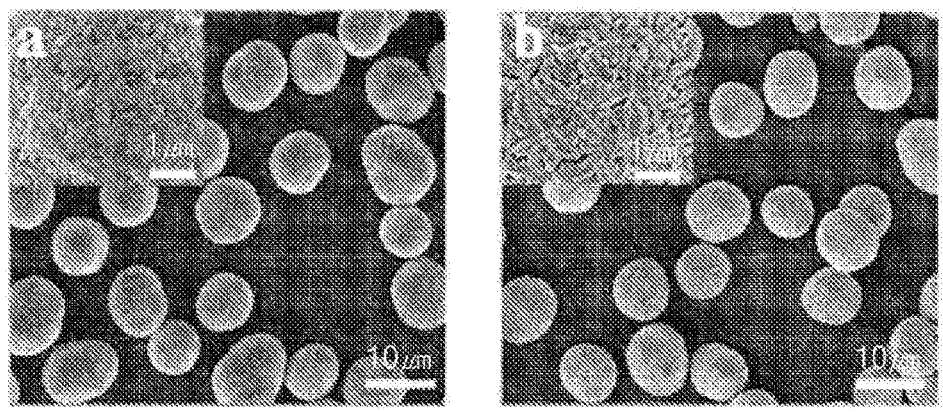
FIG. 4 is a picture of a Scanning Electron Microscope (SEM) of positive active materials according to Comparative Example 1 and Example 1-1 of the present invention.

FIG. 4 is a picture of a Scanning Electron Microscope (SEM) of positive active materials according to Comparative Example 1 and Example 1-1 of the present invention.

Referring to FIG. 4, the positive active materials according to Comparative Example 1 and Example 1-1 of the present invention were captured by using the SEM. As can be seen in FIG. 4, the positive active materials according to Comparative Example 1 and Example 1-1 have a size of about 10 to 11 μm.

Figure 5A:
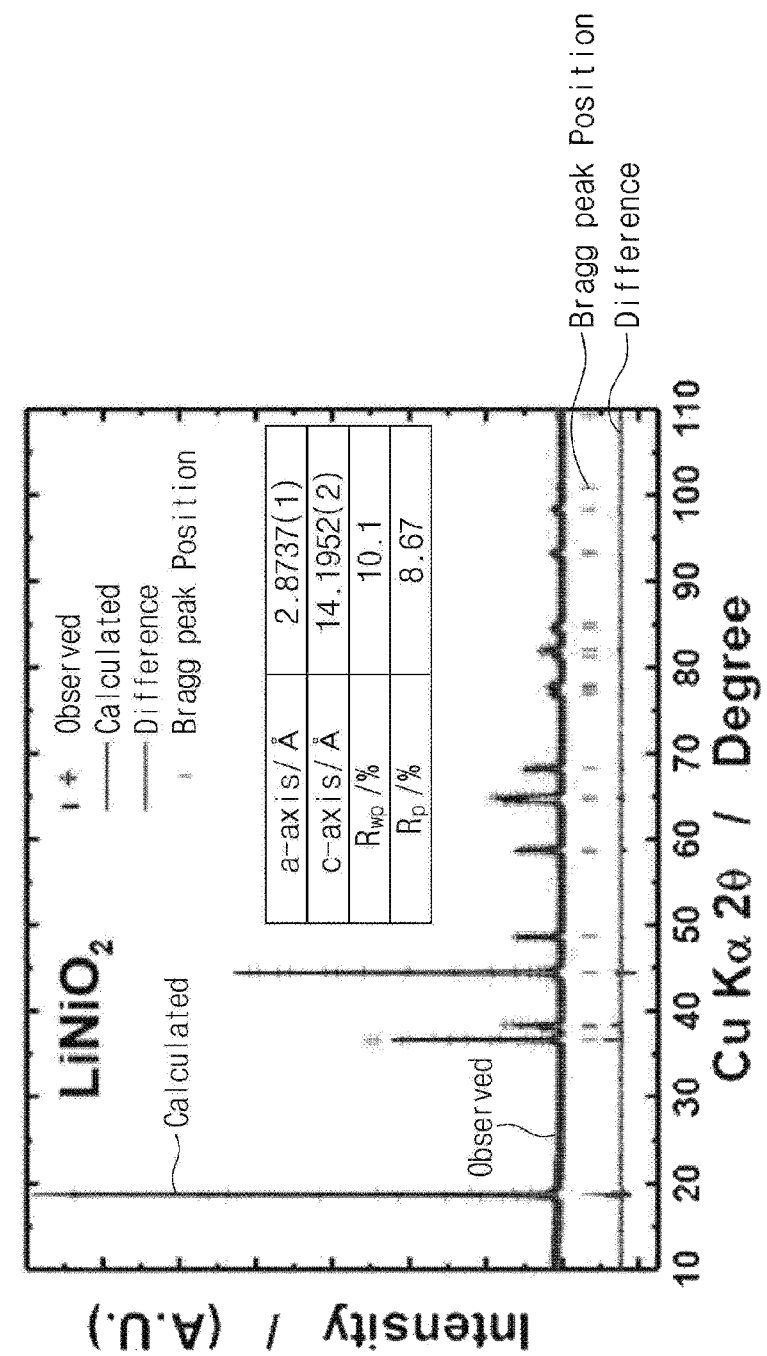
FIGS. 5A and 5B are graphs of X-ray Diffraction (XRD) measurement results of the positive active materials according to Comparative Example 1 and Example 1-1 of the present invention.
Figure 5B:
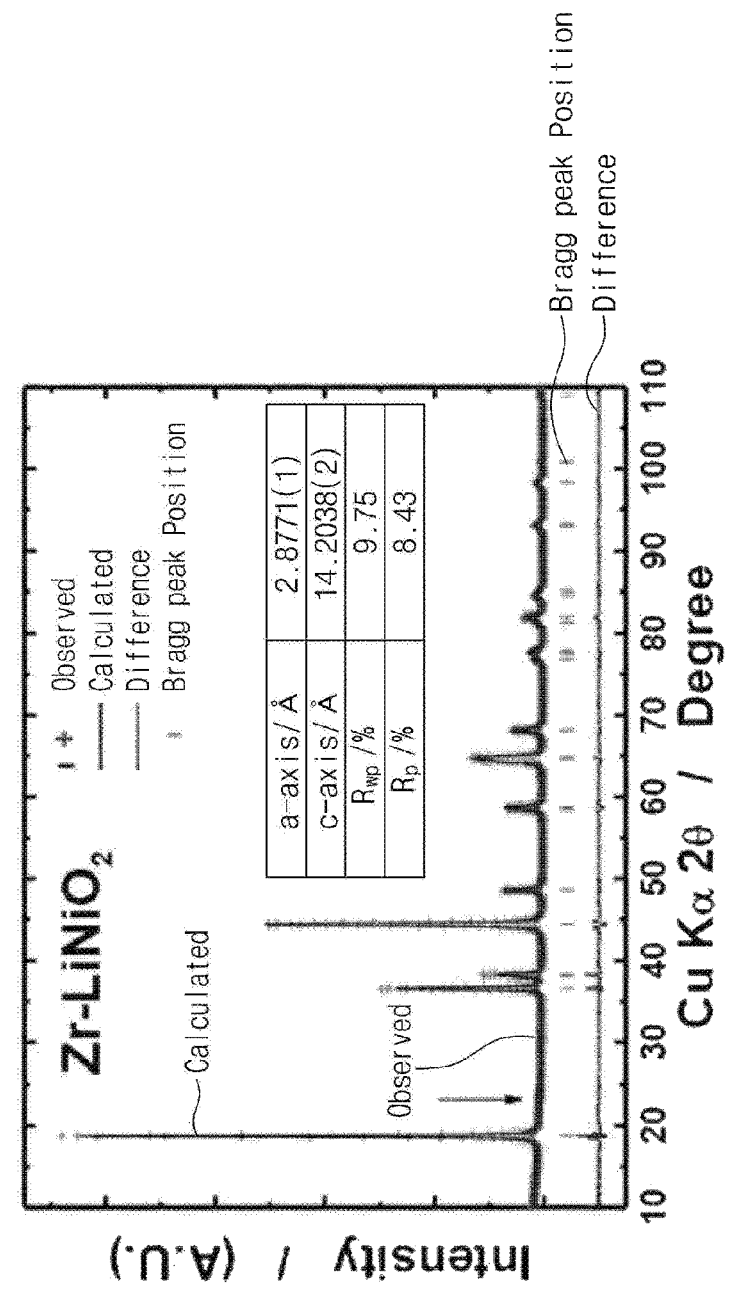

FIGS. 5A and 5B are graphs of X-ray Diffraction (XRD) measurement results of the positive active materials according to Comparative Example 1 and Example 1-1 of the present invention.

Referring to FIGS. 5A and 5B, $LiNiO_2$ means the positive active material according to Comparative Example 1 and $Zr—LiNiO_2$ means the positive active material according to Example 1-1.

From an XRD spectrum of the positive active material according to Comparative Example 1 having a space group of 3, a lattice constant of 2.8737 Å in an a-axis and a lattice constant of 14.1952 Å in a c-axis were calculated. In the case of the positive active material according to Example 1-1, in which zirconium is doped, a unit cell was increased according to the doping of zirconium, it could be seen that the positive active material has a lattice constant of 2.8771 Å in the a-axis and a lattice constant of 14.2038 Å in the c-axis.

Figure 6:
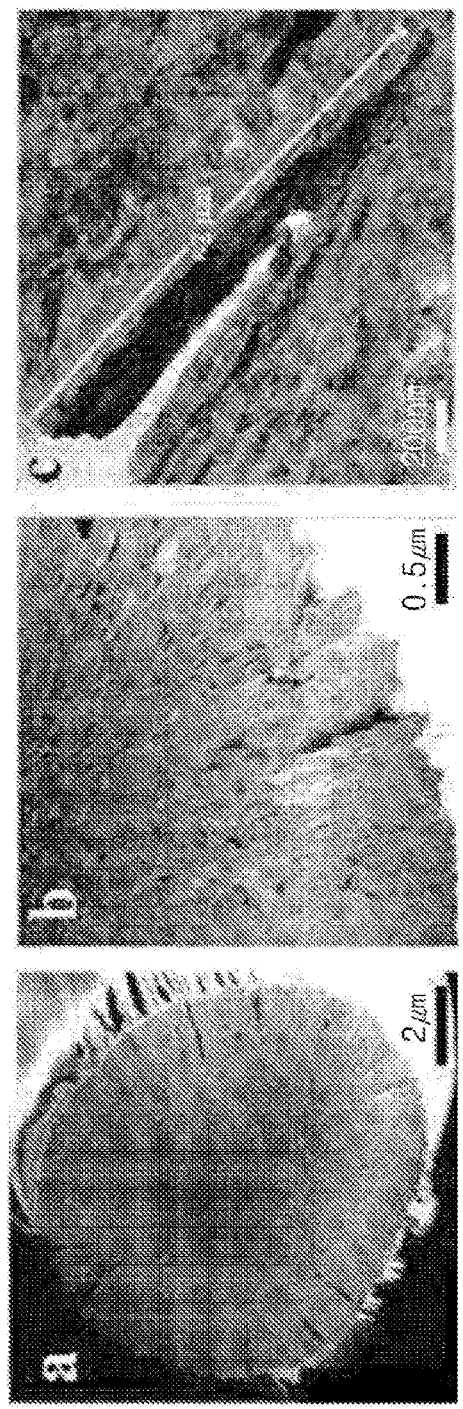
FIG. 6 is a Scanning Transmission Electron Microscope (STEM) picture of the positive active material according to Example 1-1 of the present invention.

FIG. 6 is a Scanning Transmission Electron Microscope (STEM) picture of the positive active material according to Example 1-1 of the present invention.

Referring to FIG. 6, a and b of FIG. 6 are the dark field STEM images of the positive active material according to Example 1-1 of the present invention, and it can be seen that a particle core having no pore is formed of equiaxed crystals, but the thin and long primary particles arranged in a radius direction are packed at a high density at the vicinity of the surface.

c of FIG. 6 is the bright field TEM image, and it can be seen that the primary particle has a width of about 200 nm and a length of 1 to 2 μm.

Figure 7:
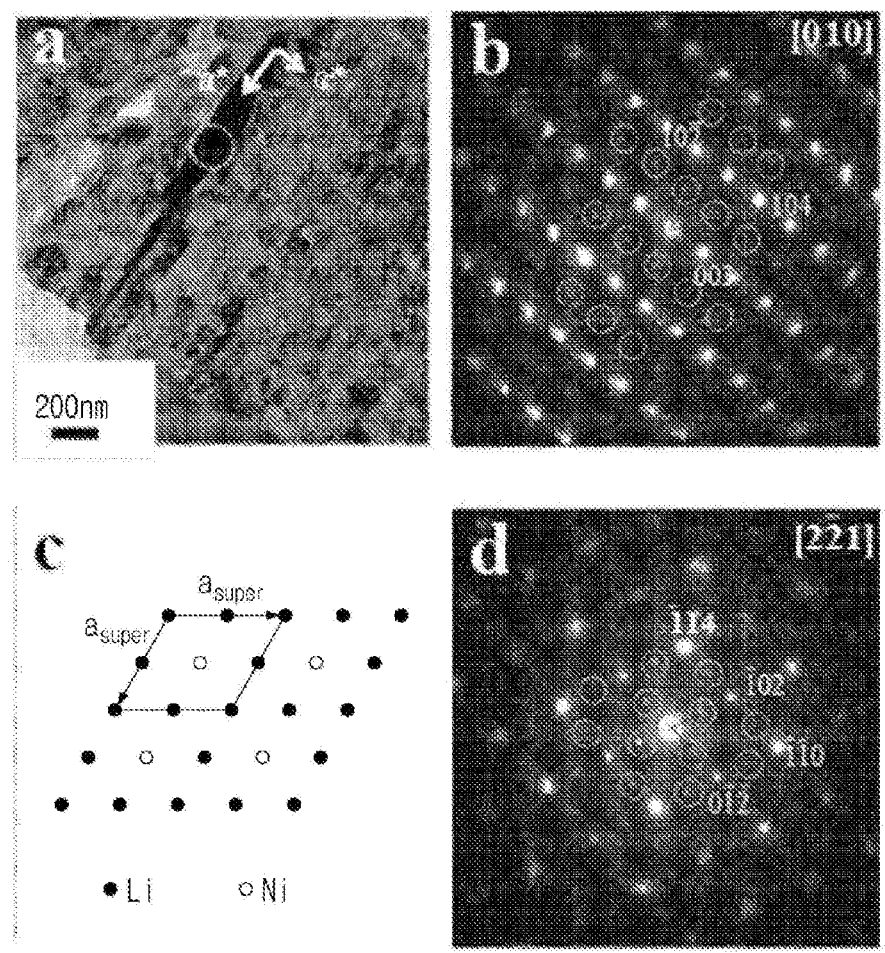
FIG. 7 is a diagram for describing a TEM picture, an ED pattern, and a lithium layer of the positive active material according to Example 1-1 of the present invention.
Figure 8:
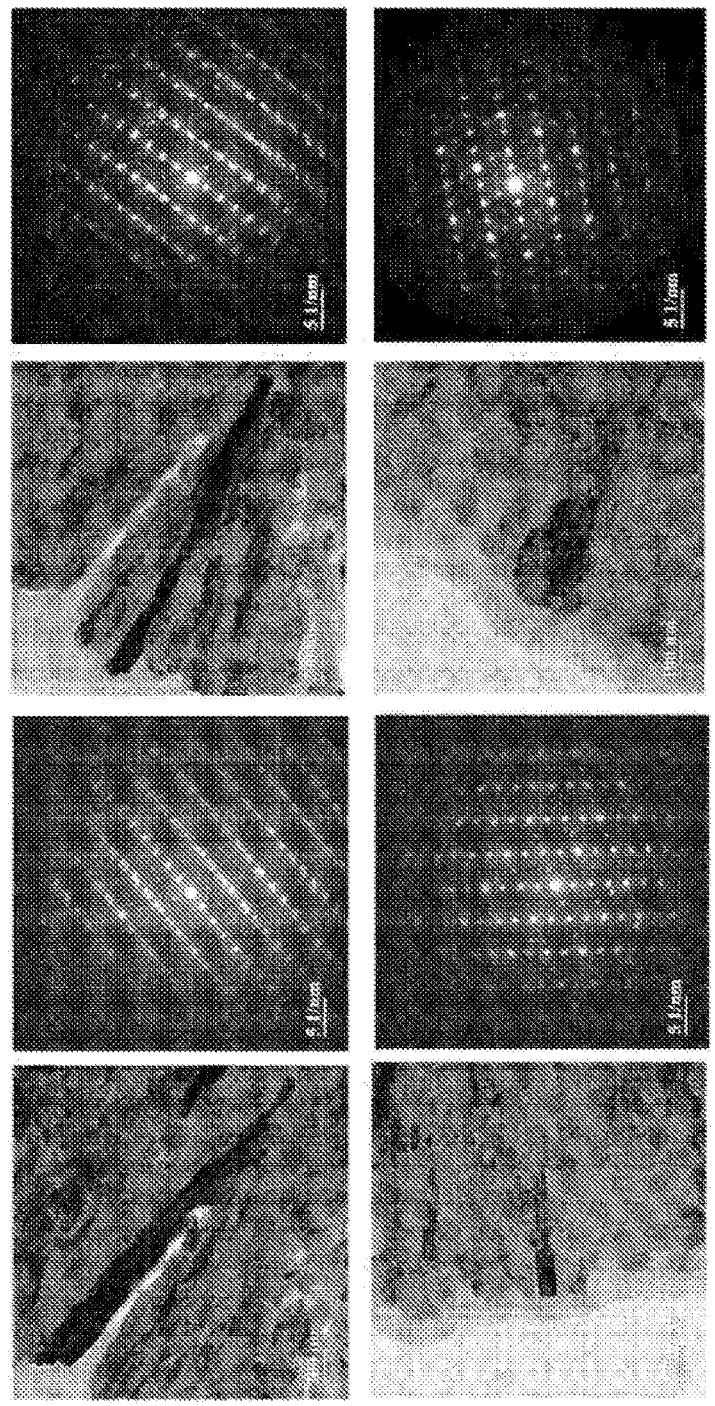
FIG. 8 is a TEM picture and an ED pattern of the positive active material according to Example 1-1 of the present invention.
Figure 9:
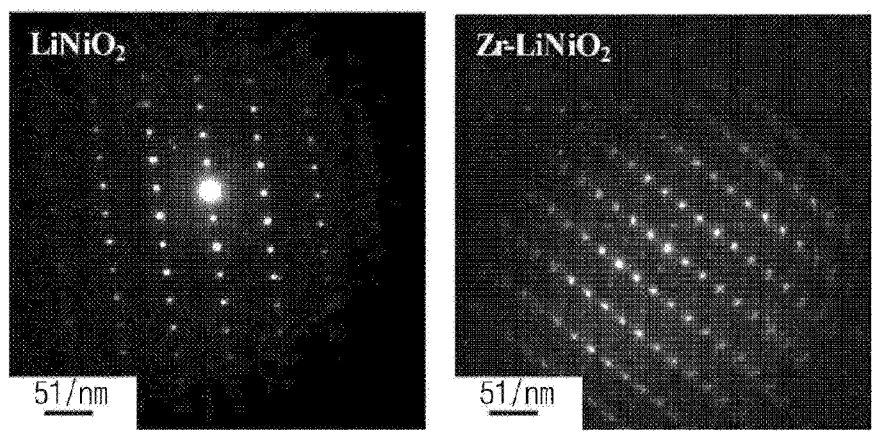
FIG. 9 is a diagram of ED patterns of the positive active materials according to Comparative Example 1 and Example 1-1 of the present invention.

FIG. 7 is a diagram for describing a TEM picture, an ED pattern, and a lithium layer of the positive active material according to Example 1-1 of the present invention, FIG. 8 is a TEM picture and an ED pattern of the positive active material according to Example 1-1 of the present invention, and FIG. 9 is a diagram of ED patterns of the positive active materials according to Comparative Example 1 and Example 1-1 of the present invention.

Referring to FIGS. 7 to 9, as illustrated in b of FIG. 7, it can be seen a crystallographic arrangement of the primary particles having a needle shape (rod shape) by the bright field TEM and an electron diffraction pattern of [010] zone. A growth direction in the a-axis of the primary particle may follow the a-axis and the primary particle may be oriented to be parallel to the radius direction of the secondary particle. The positive active material is changed to a highly anisotropic form by the zirconium doping, which may be due to the change of the surface energy of $LiNiO_2$.

Further, as illustrated in b of FIG. 7, surplus peaks (indicated with circles), which cannot be indexed in a system of the space group of $R_3^{-m}$, can be seen. $(1/20_1^-)$ indicated with an arrow and two surplus diffraction spots indexed in (1/202) in b of FIG. 7 are available only in a superlattice structure represented in c of FIG. 7. That is, the Li plane of the $R_3^-m$ structure, in which the first lithium layers (for example, the layer fully filled with Li) and the second lithium layers (for example, the layer half filled with Li) are alternately arranged, according to the exemplary embodiment of the present invention may generate a superlattice having an a-axis length with a value that is two times an a-axis length of the lattice constant of original $LiNiO_2$ in which positive ions are arranged.

In b of FIG. 7, in the system of space groups of R3m, extra peaks (circular indication) that cannot be indexed are identified, and in the below, the extra peaks (circular indication) are represented as a second diffraction point group, and peaks that are relatively brighter than the second diffraction point group are represented as a first diffraction point group.

A positive active material according to the present exemplary embodiment may include: a first lithium layer in which lithium is regularly arranged; and a second lithium layer in which lithium and a transition metal are regularly arranged; a first transition metal layer in which the transition metal is regularly arranged; and a second transition metal layer in which the transition metal and lithium are regularly arranged, in which the second lithium layer and the second transition metal layer may be alternately provided. In the positive active material, as a result of an electron diffraction pattern fora zone axis or a zone axis, a first diffraction spot group which corresponds to a lattice formed by the first lithium layer and the first transition metal layer and is formed by aligning one or more diffraction spots having relatively high strength in one direction, and a second diffraction spot group which corresponds to a lattice formed by the second lithium layer and the second transition metal layer and is formed by aligning one or more diffraction spots having relatively lower strength than the strength of the diffraction spot included in the first diffraction spot group in one direction may be observed. In the second lithium layer, the lithium and the transition metal may be alternately arranged, in the second transition metal layer, the transition metal and the lithium may be alternately arranged, a lattice formed by the second lithium layer and the second transition metal layer may include a superlattice, and the superlattice may include six lithium elements and one transition metal element. The first diffraction spot group and the second diffraction spot group may be alternately and regularly arranged, and the first diffraction spot group and the second diffraction spot group may be provided while being spaced apart from each other at the same interval.

Referring to d of FIG. 7, in order to check a superlattice peak, an electron diffraction pattern of $[2_2{}^-1]$ zone was observed from another primary particle. The spots indexed with $(1/20_1{}^-)$ and $(0_1{}^-/2_1{}^-)$ may correspond to the superlattice peak represented in b of FIG. 7. Further, in the diffraction pattern of FIG. 7, the superlattice diffraction pattern may be observed in the vicinity of the primary particle adjacent to the surface of $LiNiO_2$ doped with zirconium.

In the meantime, the surplus spots according to the superlattice structure were not observed in the positive active material according to Comparative Example 1 in which zirconium is not doped as can be seen in FIGS. 8 and 9. Accordingly, it can be seen that the positive ions in $LiNiO_2$ doped with zirconium is not locally arranged and are seen in the vicinity of the surface.

Figure 10:
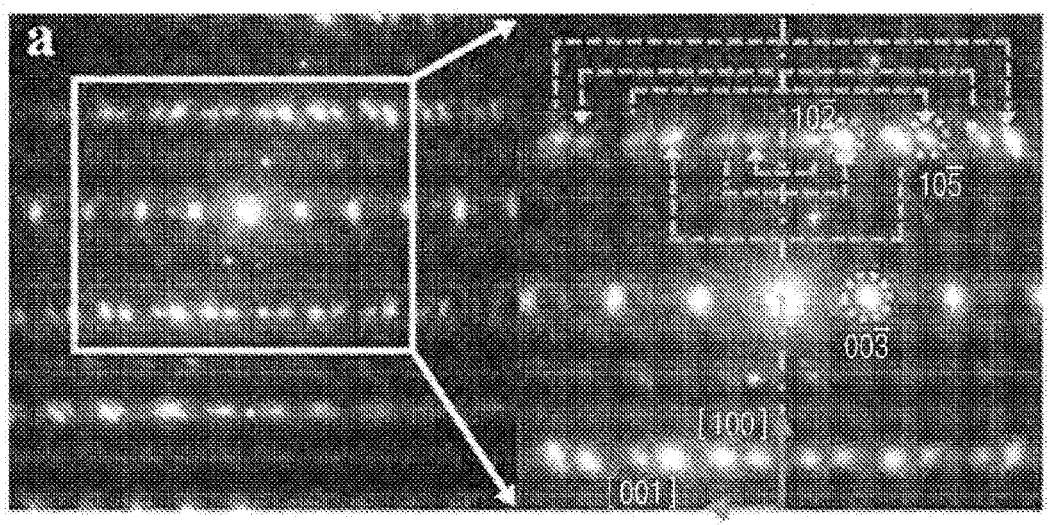
FIG. 10 is a diagram for describing an ED pattern and an atomic arrangement of the positive active material according to Example 1-1 of the present invention.
Figure 10:
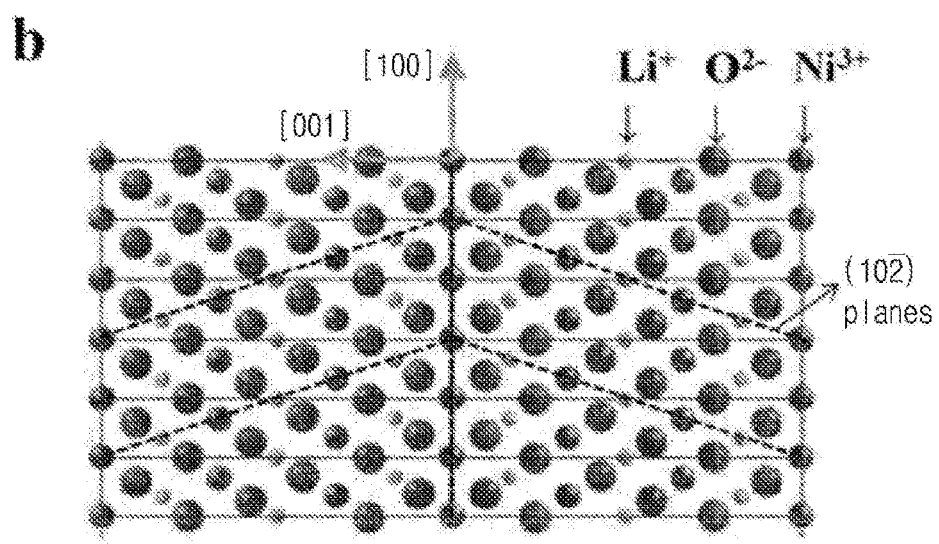
Figure 11:
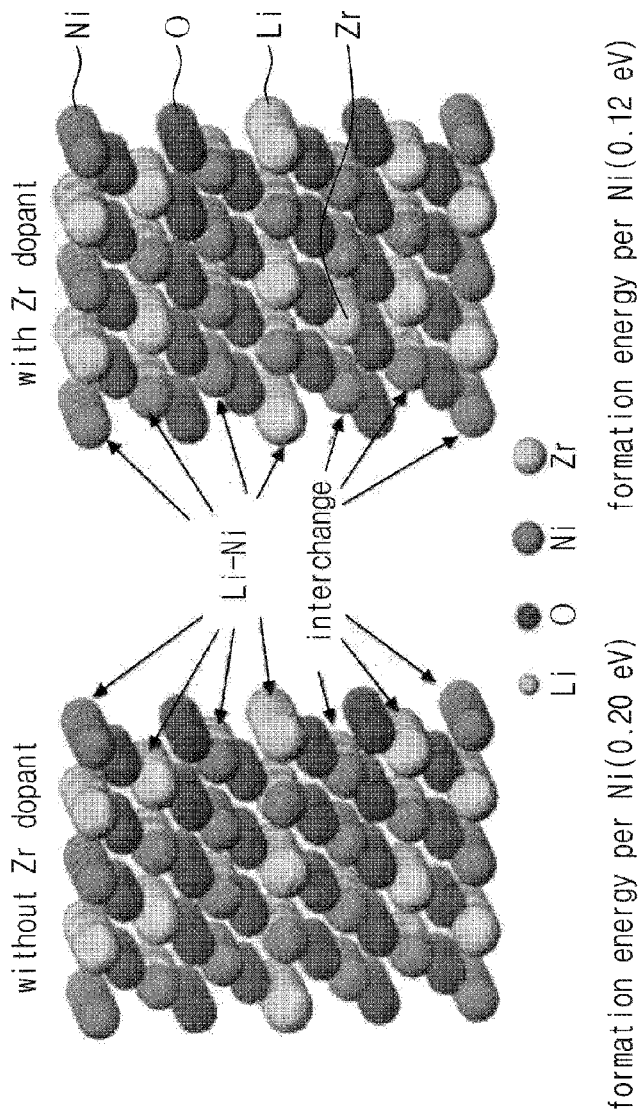
FIG. 11 is a diagram for describing an atomic structure and formation energy of the positive active material according to Example 1-1 of the present invention.
Figure 12:
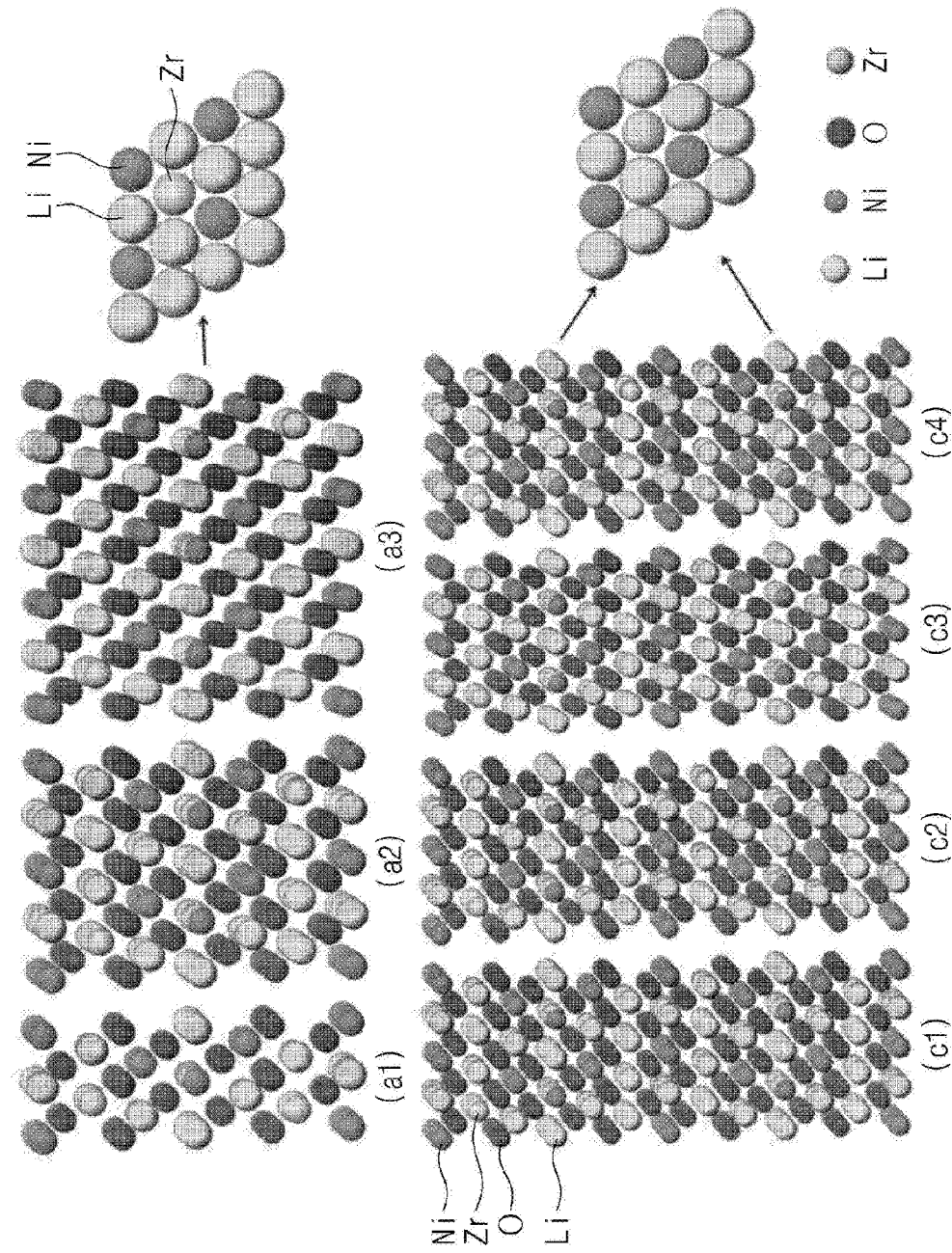
FIG. 12 is a diagram for describing an atomic structure according to a concentration of Zr in the positive active material according to Example 1-1 of the present invention.
Figure 13:
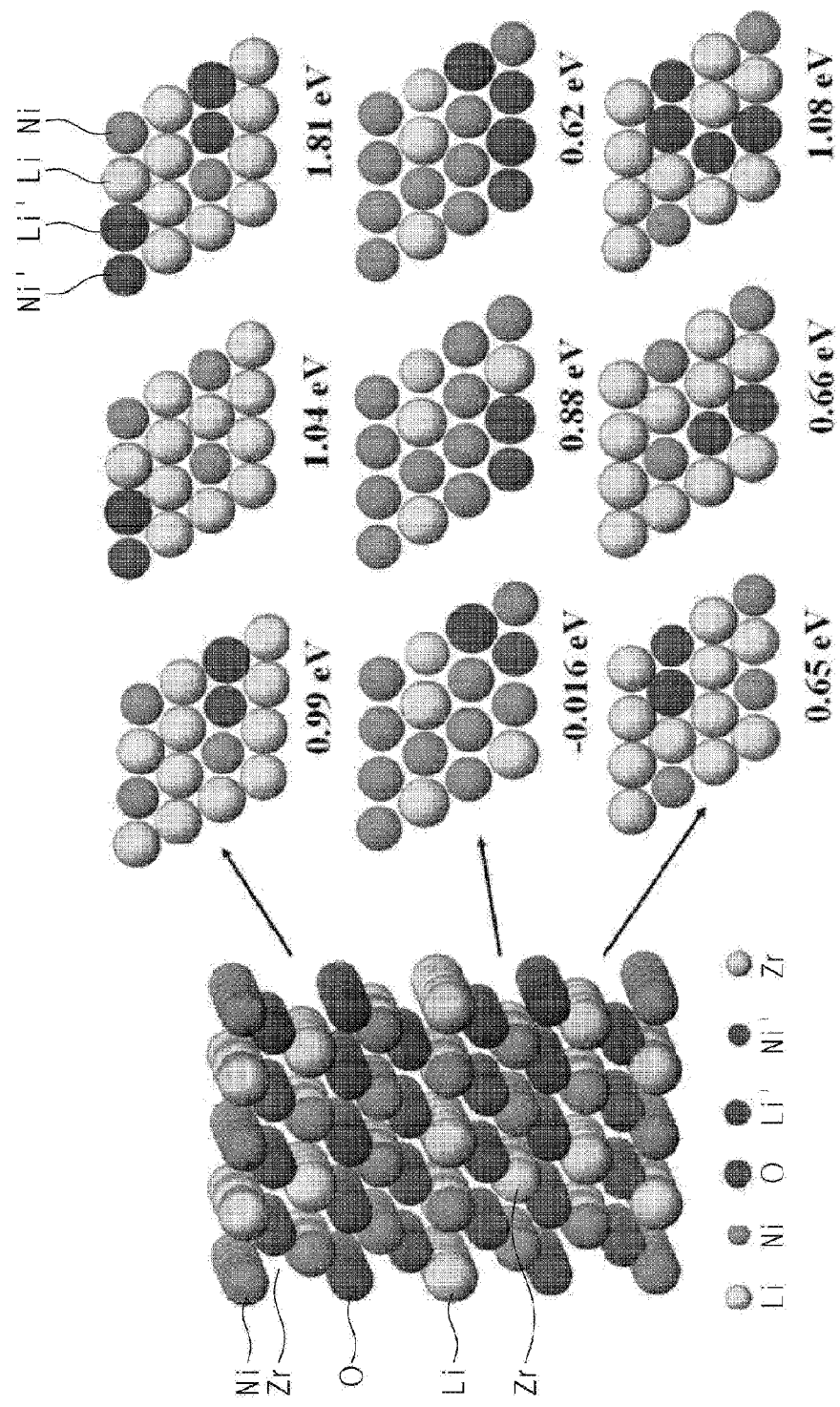
FIG. 13 is a diagram for describing a possible arrangement structure of lithium and nickel and energy according to the arrangement structure in the positive active material according to Example 1-1 of the present invention.
Figure 14A:
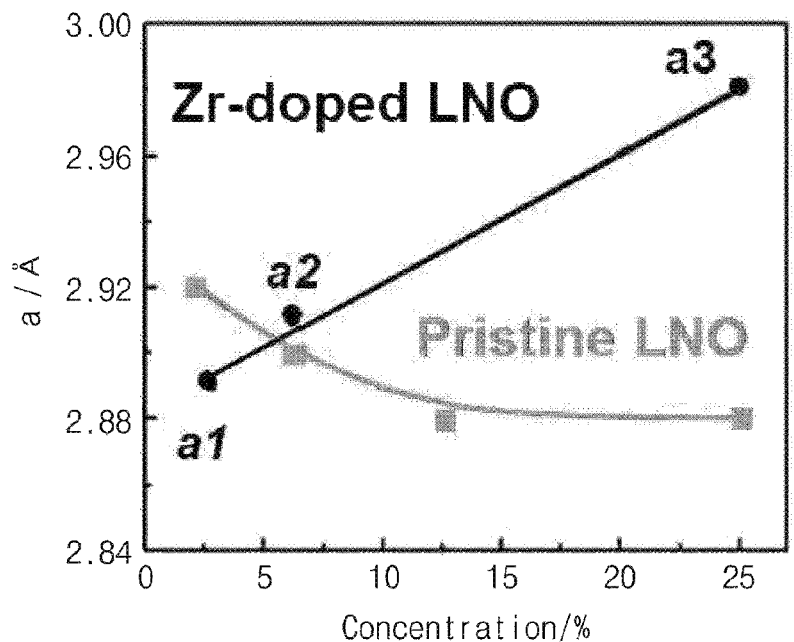
FIGS. 14A, 14B, 14C and 14D are graphs for describing a lattice constant of the positive active materials according to Example 1-1 and Comparative Example 1 of the present invention.
Figure 14B:
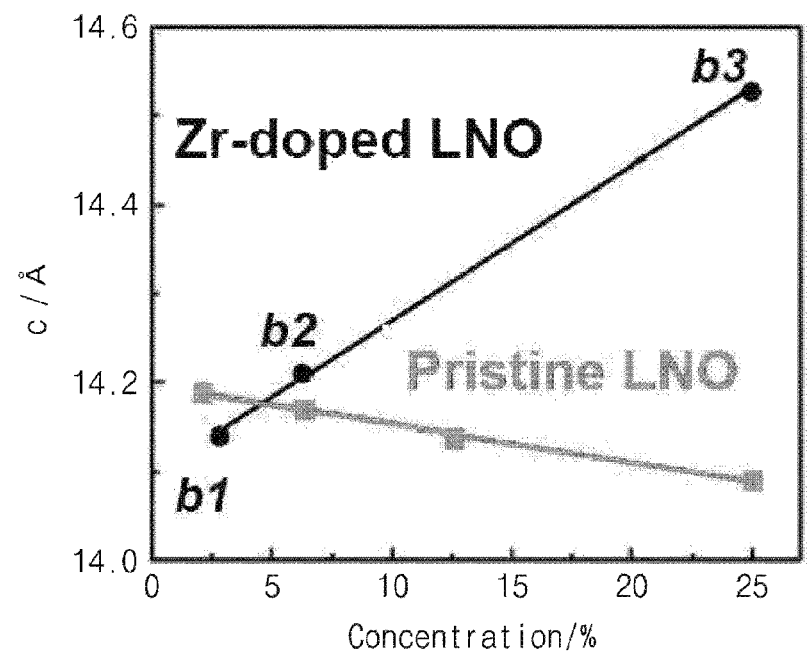
Figure 14C:
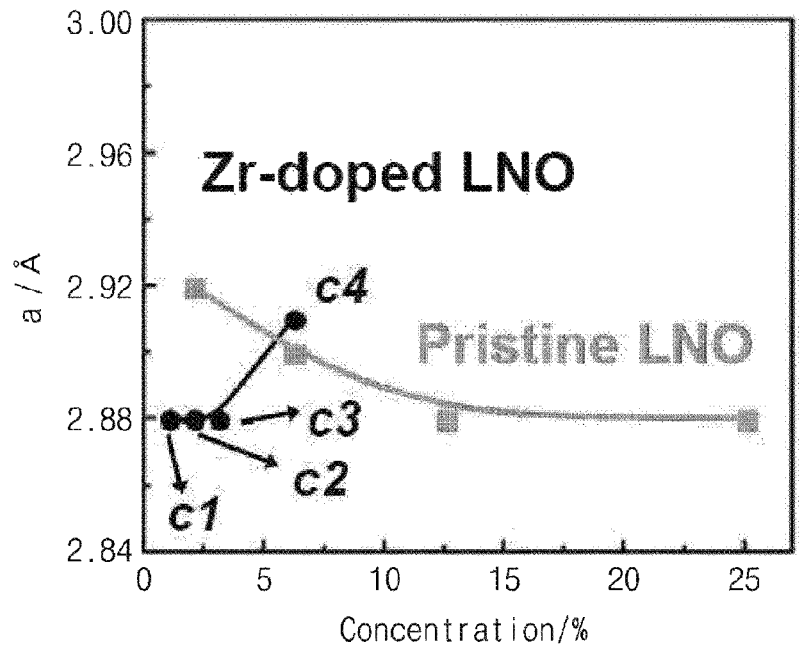
Figure 14D:
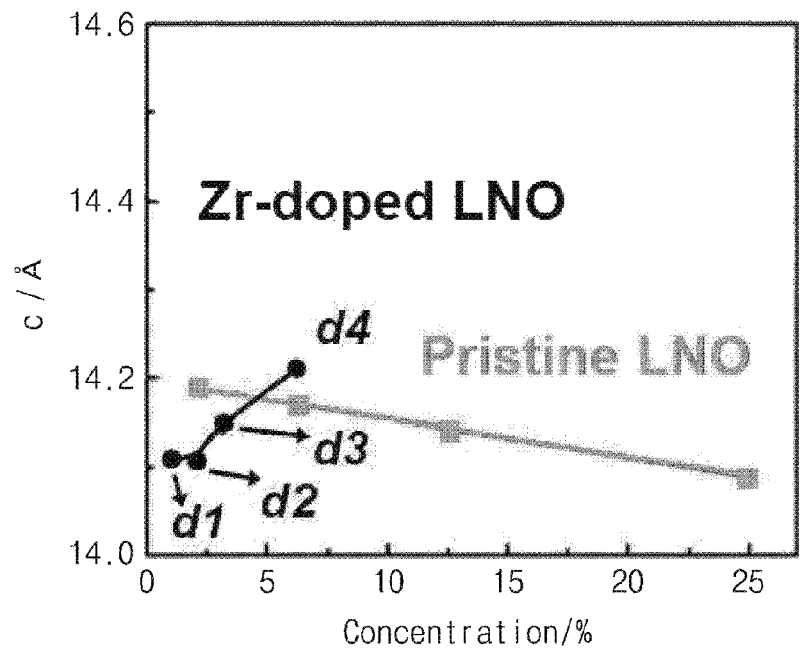
Figure 15:
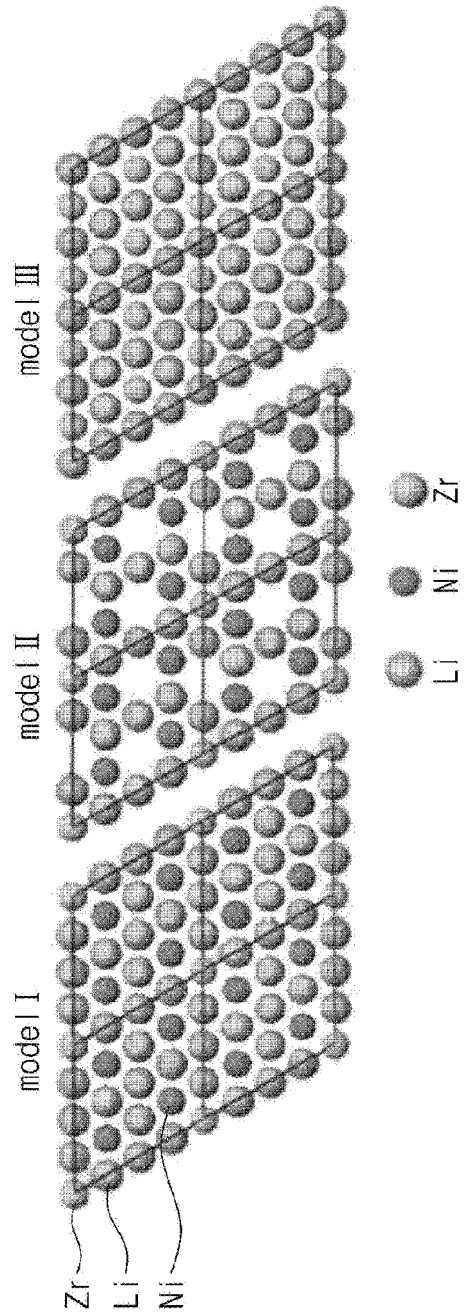
FIG. 15 is a diagram for describing modelling for a calculation of a lattice constant of the positive active material according to Example 1-1 of the present invention.

FIG. 10 is a diagram for describing an ED pattern and an atomic arrangement of the positive active material according to Example 1-1 of the present invention, FIG. 11 is a diagram for describing an atomic structure and formation energy of the positive active material according to Example 1-1 of the present invention, FIG. 12 is a diagram for describing an atomic structure according to a concentration of Zr in the positive active material according to Example 1-1 of the present invention, FIG. 13 is a diagram for describing a possible arrangement structure of lithium and nickel and energy according to the arrangement structure in the positive active material according to Example 1-1 of the present invention, FIG. 14 is a graph for describing a lattice constant of the positive active materials according to Example 1-1 and Comparative Example 1 of the present invention, and FIG. 15 is a diagram for describing modelling for a calculation of a lattice constant of the positive active material according to Example 1-1 of the present invention.

Referring to FIGS. 10 to 15, a plurality of twined crystals was observed in $LiNiO_2$ doped with zirconium according to Example 1-1 of the present invention. In a of FIG. 10, an electron diffraction pattern is seen in [010] zone of the twined crystal. A pair of diffraction spots in the pattern may be explained from the spots in [010] zone that is a mirror image of (001) plane for forming a set of diffraction pattern of $[0_1{}^-0]$ zone as illustrated. Further, a pair of surplus peaks by the arrangement of the positive ions is seen in the twined crystal diffraction pattern. Referring to the schematic diagram of the twined crystal representing a mirror image of $(10_2{}^-)$ surface in b of FIG. 10, it can be clearly seen the twined crystal structure having (001) surface as a twined crystal boundary.

The twined crystal may be formed by the arrangement of the positive ions, and the arrangement of the positive ions is not observed in $LiNiO_2$ according to Comparative Example 1, so that it can be seen that the positive ions are arranged in $LiNiO_2$ by Zr ions.

In order to supplement the experimental result, when it is assumed that the Li layer and the Ni layer form an isotropic supercell structure formed of $[Li_{0.75}Ni_{0.25}]_{3a}[Li_{0.75}Ni_{0.25}]_{3b}O_2$, a DFT calculation method is used for estimating forming energy required for exchanging Li ions and Ni ions (see FIG. 11). Two possible distributions for the placement of a Zr dopant were considered, and a corresponding atomic structure is illustrated in FIG. 12. Exchange energy per Ni (Li) ion in Pristine $[Li_{0.75}Ni_{0.25}]_{3a}[Li_{0.75}Ni_{0.25}]_{3b}O_2$, in which zirconium is not doped, was calculated as 0.20 V, but in the case of the doping in which the Li ion is substituted with the Zr ion, when the concentrations of dopants are 2.08% and 6.25%, exchange energy was calculated as 0.14 eV and 0.12 eV, respectively. Ion radiuses of a $Zr_{4+}$ (80 pm) ion and a $Li^+$ (79 pm) ion are similar to each other, so the Li ion is substituted with the Zr ion. However, the Ni ion is substituted with the Zr ion, the exchange energy is still low in the doping structure, compared to the pristine structure. The feature that the Li—Ni mutual substitution by Zr induces the alignment structure of the positive ions can be proved by calculating the total energy of the possible composition of $[Li_{0.75} Ni_{0.25}]_{3a}[Li_{0.75}Ni_{0.25}]_{3b}O_2$ having the structure in which the Ni and Li positive ions are not arranged (see FIG. 13). It can be seen that the total energy calculated in almost all non-arranged structure is larger than the total energy in the arranged structures. However, it can be seen that 16 meV is more advantageous compared to the structure in which only one composition is arranged, and it is identified that this is because energy is obtained by the interchange between $Li^+$ positive ions having a smaller charge and $Li^{3+}$ positive ions at a short distance with the $Li^+$ positive ions. The effect in the narrow zone is limited only to the positive ions in the vicinity of the dopant, so that the arrangement of the positive ions in a broad zone in the doped structure is impossible. A lattice constant calculated from the different ratios of Li—Ni interchange shows that the a and c constants decrease as the ratio of the Li—Ni exchange in pristine $LiNiO_2$ increases. However, the a constant represents a value exceeding 12.5%.

In the meantime, the c constant linearly decreases with respect to all of the Li—Ni interchange concentrations.

Further, in a percentage value, it can be seen that the relative decrease in the a constant is large compared to the c constant.

Referring to FIG. 14, it can be seen that a lattice dimension is expanded according to an increase in the concentration of Zr substituted with Li. Two dopant distributions, that is, as can be seen in a and b of FIG. 14, the Zr—Zr separation is large in the a-b plane, but is small along the c-axis, and as can be seen in c and d of FIG. 14, the Zr—Zr separation is large in the a-b plane, but is large along the c-axis, were considered. According to the experimental XRD result, in the two cases of pristine and $LiNiO_2$ doped with zirconium, the lattice constants are similar, and the Li—Ni interchange concentration determined by the Rietveld refinement method is relatively small (about 2%).

In order to satisfy the two conditions, $[Li_{0.98}Ni_{0.02}]_{3a}[Li_{0.98}Ni_{0.02}]_{3b}O_2$ and $[Zr_{0.0625}Li_{0.6875}Ni_{0.25}]_{3a}[N_{0.75}Li_{0.25}]_{3b}O_2$ were borrowed for calculating each delithiation energy. The local Zr concentration may be high due to the agglomeration of Zr in the vicinity of the particle surface where the positive ions are predominantly arranged. The calculated lattice constant is 2.92 Å in the a-axis and 14.19 Å in the c-axis, and is 2.91 Å in the a-axis and 14.20 Å in the c-axis for $[Li_{0.98}Ni_{0.02}]_{3a}[Li_{0.98}Ni_{0.02}]_{3b}O_2$ and $[Zr_{0.0625}Li_{0.6875}Ni_{0.25}]_{3a}[N_{0.75}Li_{0.25}]_{3b}O_2$, respectively. The differences between the calculation value and the experimental value of 1.38%, −0.07% and 1.04%, 0.07% are due to the approximate characteristic corresponding to the experimental value of the interexchange function in the DFT and calculation errors, and continuously, delithiation energy for $Li_{1-x}NiO_2$, $[Li_{0.98-x}Ni_{0.02}]_{3a}[Li_{0.98}Ni_{0.02}]_{3b}O_2$, and $[Zr_{0.0625}Li_{0.6875-x}Ni_{0.25}]_{3a}[N_{0.75}Li_{0.25}]_{3b}O_2$, which have the x values of 0.0208, 0.1250, and 0.1875, respectively, is calculated as represented in the table below.

TABLE 2

| | State of charge, x | | |
| --- | --- | --- | --- |
| | 0.0208 | 0.125 | 0.1875 |
| perfect $Li_{1-x}NiO_2$ | 3.48 | 3.31 | 3.18 |
| $[Li_{0.98-x}Ni_{0.02}]_{3a}[Ni_{0.98}Li_{0.02}]_{3b}O_2$ | 3.11 | 3.19 | 3.18 |
| $[Zr_{0.0625}Li_{0.6875-x}Ni_{0.25}]_{3a}[Ni_{0.75}Li_{0.25}]_{3b}O_2$ | 3.14 | 3.12 | 3.12 |

Figure 16A:
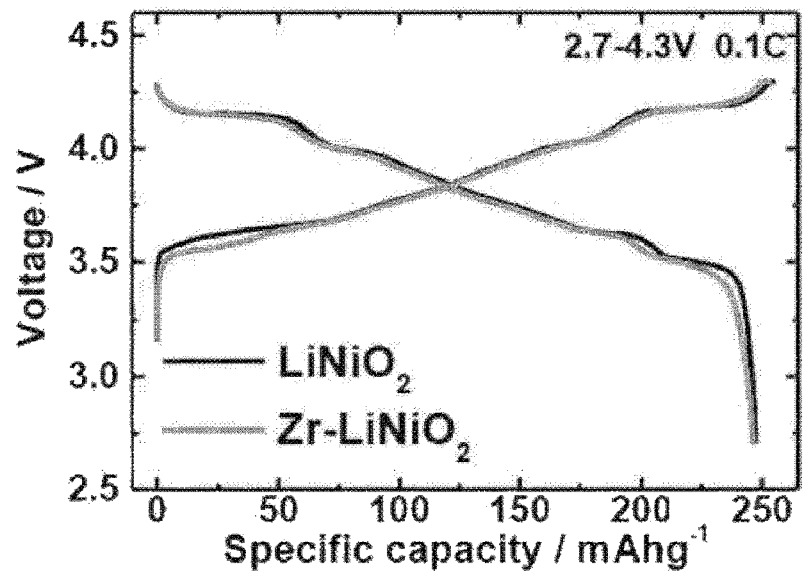
FIGS. 16A, 16B, and 16C are graphs for describing a capacity characteristic, a life characteristic, and a rate capability of the positive active materials according to Example 1-1 and Comparative Example 1 of the present invention.
Figure 16B:
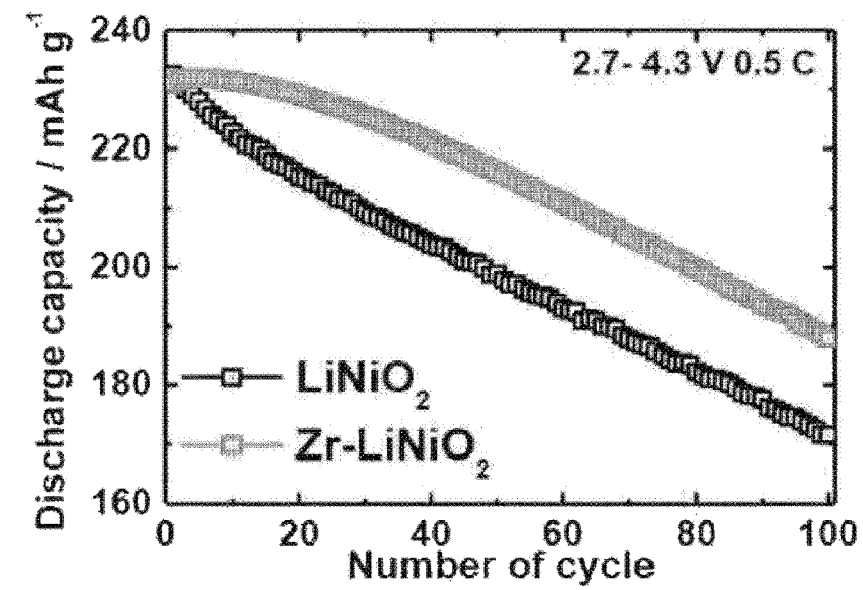
Figure 16C:
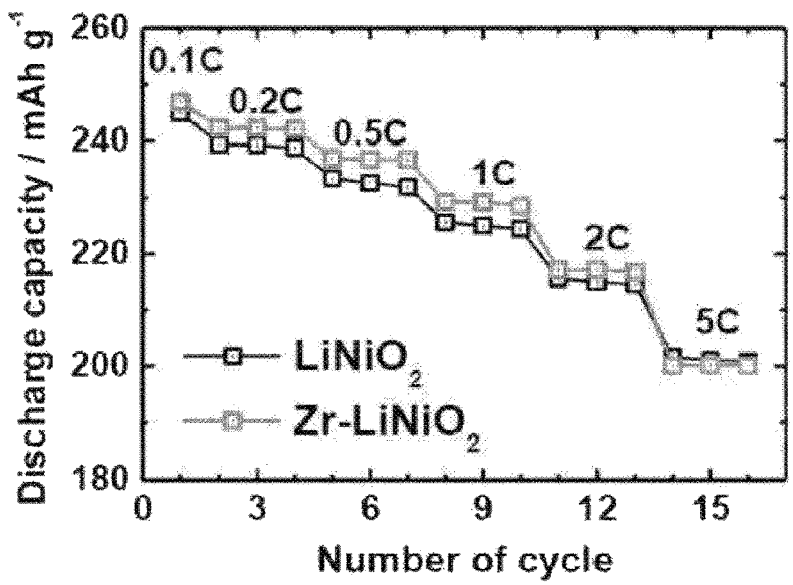

Delithiation energy per Li decreases with increasing delithiation in the first case, but there is no significant change to the second and third cases. Although delithiation energy is higher in pristine compared to the interchange case and the zirconium doping case, it can be seen that in the high-level delithiation, the delithiation energy is similar in all three cases. This shows that the zirconium doped structure has similar stability to that of the zirconium undoped structure with or without the Li—Ni interchange of 2%. In order to further verify the structural model for the calculation, when U=3.0 and U=4.0 (Zr is constant and Ni varies), an influence of Hubbard-U constant was investigated by recalculating a, b, and c constants in $[Zr_{0.0625}Li_{0.6875}Ni_{0.25}]_{3a}[N_{0.75}Li_{0.25}]_{3b}O_2$ (described as model 1). Referring to FIG. 15, it can be seen that the change of the U constant from 3 to 4 does not significantly affect the lattice constant value. Further, in model 1, the possibility of Li vacancy formation is obtained by removing three Li in the layer in which Zr is located ($[Zr_{0.0625}Li_{0.50}Ni_{0.25}]_{3a}[N_{0.75}Li_{0.25}]_{3b}O_2$ (described as model 2)). In model 2, the change of the $Zr^{4+}$ dopant is compensated by the replaced $Li^+$ and three $LI^+$ vacancies. The a and b constant values for model 2 correspond to the experimental result compared to model 1. In contrast, in model 2, the c constant shows a large value compared to model 1, and the value corresponds well to the experimental value. However, a deviation of the lattice constants calculated in model 1 and model 2 from the experimental value is less than 1.04%. Further, the structure in which 25% of Li is substituted with Zr without the Li—Ni interchange was evaluated ($[Zr_{0.25}Li_{0.75}]_{3a}[Ni_{1.00}]_{3b}O_2$, described as model 3). The comparison of the lattice constants in model 3 and the experimental measurement reveals that model 3 is undesirable. FIGS. 16A, 16B, and 16C are graphs for describing a capacity characteristic, a life characteristic, and a rate capability of the positive active materials according to Example 1-1 and Comparative Example 1 of the present invention, FIG. 17 is a graph for describing a capacity characteristic according to the number of times of charge/discharge of the positive active material according to Comparative Example 1 of the present invention, and FIG. 18 is a graph for describing a capacity characteristic according to the number of times of charge/discharge of the positive active material according to Example 1-1 of the present invention.

Figure 17:
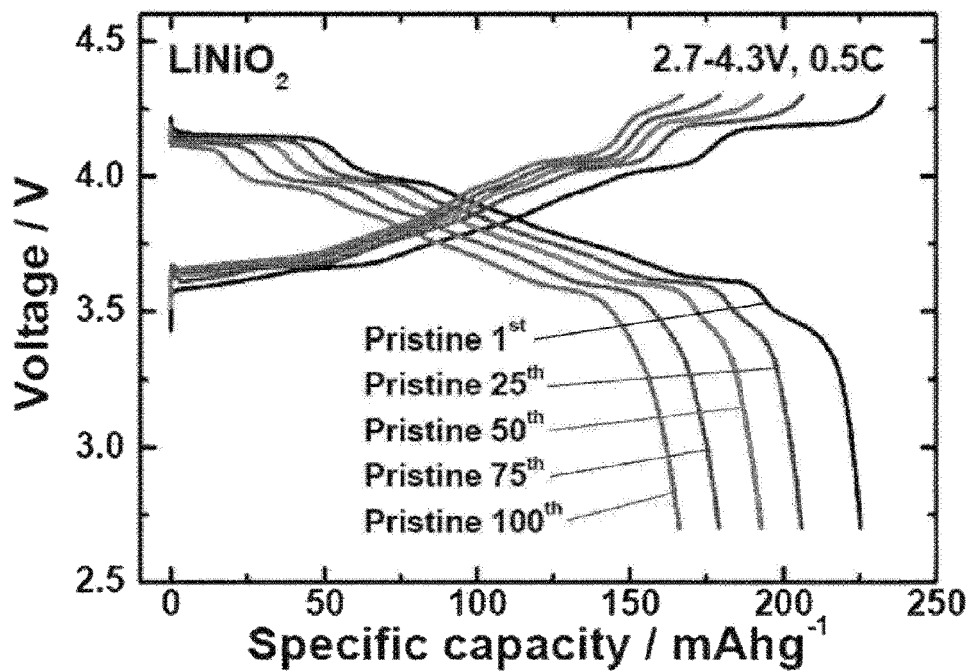
FIG. 17 is a graph for describing a capacity characteristic according to the number of times of charge/discharge of the positive active material according to Comparative Example 1 of the present invention.
Figure 18:
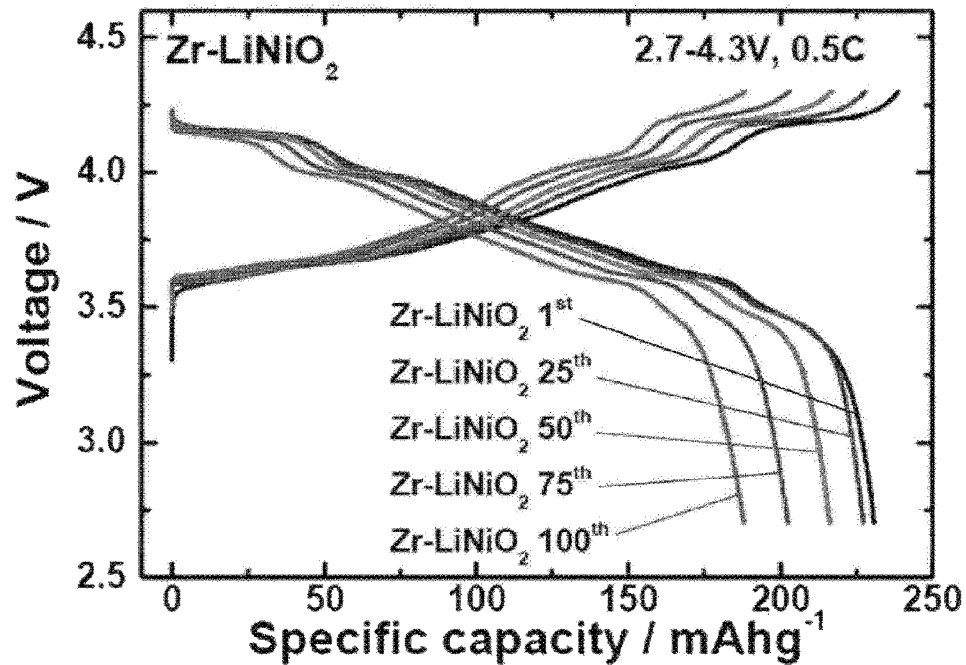
FIG. 18 is a graph for describing a capacity characteristic according to the number of times of charge/discharge of the positive active material according to Example 1-1 of the present invention.

Referring to FIGS. 16 to 18, half cells were manufactured by using the positive active materials according to Example 1-1 and Comparative Example 1, a discharge capacity was measured under the condition of cut off 2.7 to 4.3V and 0.1C, a life characteristic was measured under the condition of cut off 2.7 to 4.3V and 0.5C, and a rate capability was measured.

It is confirmed that an initial discharge capacity of a lithium secondary battery including the positive active materials according to Comparative Example 1 and Example 1-1 is ideal with Coulombic efficiency of about 97%. Particularly, the initial discharge capacity was measured as 247.5 mAh/g in Comparative Example 1 and 246.5 mAh/g in Example 1-1. Then, it can be seen that in a voltage profile, the discharge capacity of the positive active material according to Comparative Example 1 rapidly decreases compared to an initial cycle, but the positive active material according to Example 1-1 doped with zirconium maintains a stable state. That is, referring to FIG. 16A, it can be seen that the positive ion arrangement (that is, the interchange of the Li and Ni ions) has little effect on the de-intercalation/insertion of Li.

The Li migration may be facilitated by the arrangement of the primary particles arranged from the center portion toward the surface portion of the secondary particle, and as can be seen in the cycle performance illustrated in FIG. 16B, it can be seen that the zirconium doping has excellent cycle stability. A discharge capacity of a $LiNiO_2$ positive electrode doped with zirconium according to Example 1-1 maintains 81% of the initial discharge capacity after 100 cycles at 0.5C (90 mA/g), but a discharge capacity of the positive active material according to Comparative Example 1 was measured to be 74% of the initial discharge capacity for the same cycle.

Further, referring to FIG. 16C, a capacity maintenance rate of the positive active material according to Comparative Example 1 shows 82.0% in 5 C, and the positive active material doped with zirconium according to Example 1-1 was measured to be 81% in 0.1 C.

Figure 19:
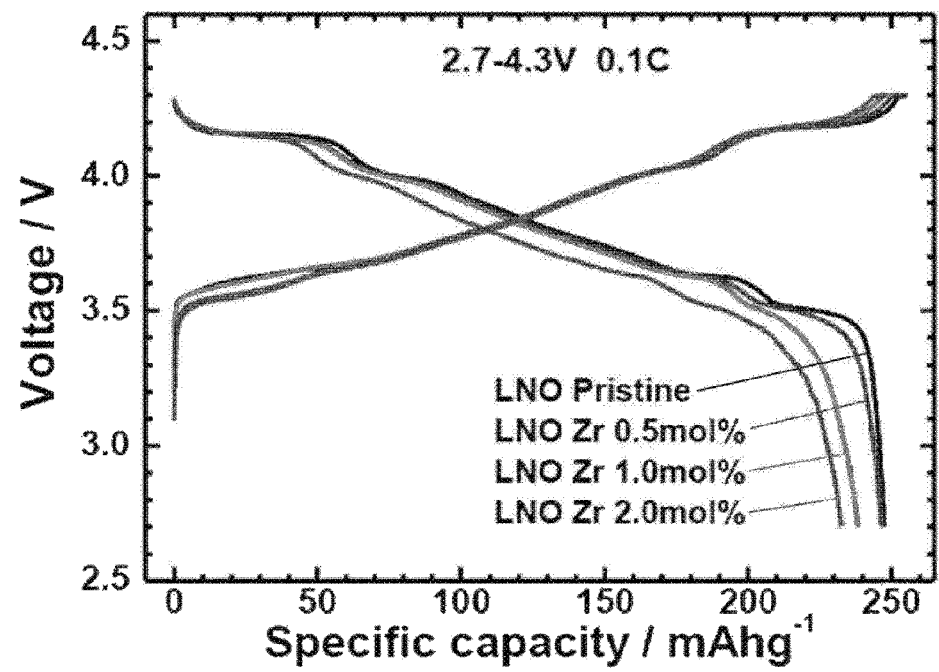
FIG. 19 is a graph illustrating measured capacity characteristics of lithium secondary batteries including the positive active materials according to Examples 1-1 to 1-3 and Comparative Example 1 of the present invention.
Figure 20:
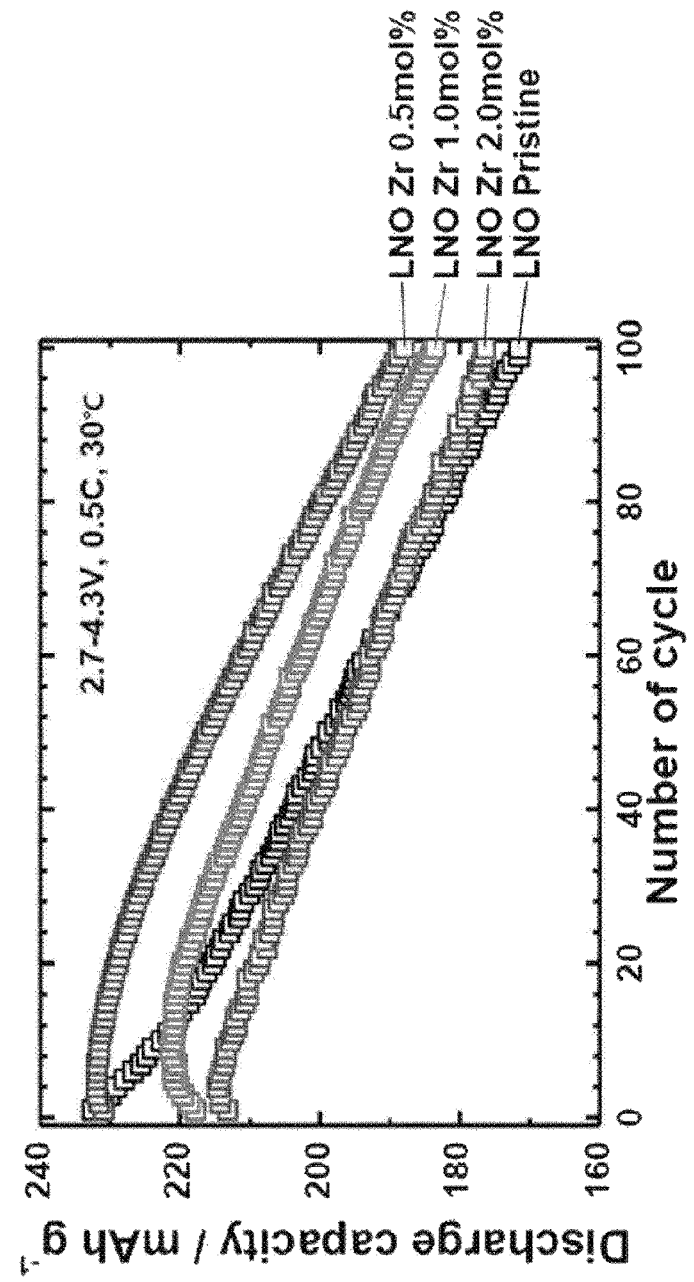
FIG. 20 is a graph illustrating measured life characteristics of lithium secondary batteries including the positive active materials according to Examples 1-1 to 1-3 and Comparative Example 1 of the present invention.

FIG. 19 is a graph illustrating measured capacity characteristics of lithium secondary batteries including the positive active materials according to Examples 1-1 to 1-3 and Comparative Example 1 of the present invention, and FIG. 20 is a graph illustrating measured life characteristics of lithium secondary batteries including the positive active materials according to Examples 1-1 to 1-3 and Comparative Example 1 of the present invention.

Referring to FIGS. 19 and 20, half cells were manufactured by using the positive active materials according to Examples 1-1 to 1-3 and Comparative Example 1, a discharge capacity was measured under the condition of cut off 2.7 to 4.3V and 0.1 C, and a capacity change according to the number of times of the charge/discharge cycle was measured under the condition of cut off 2.7 to 4.3V, 0.5 C, and a temperature of 30° C.

Figure 22:
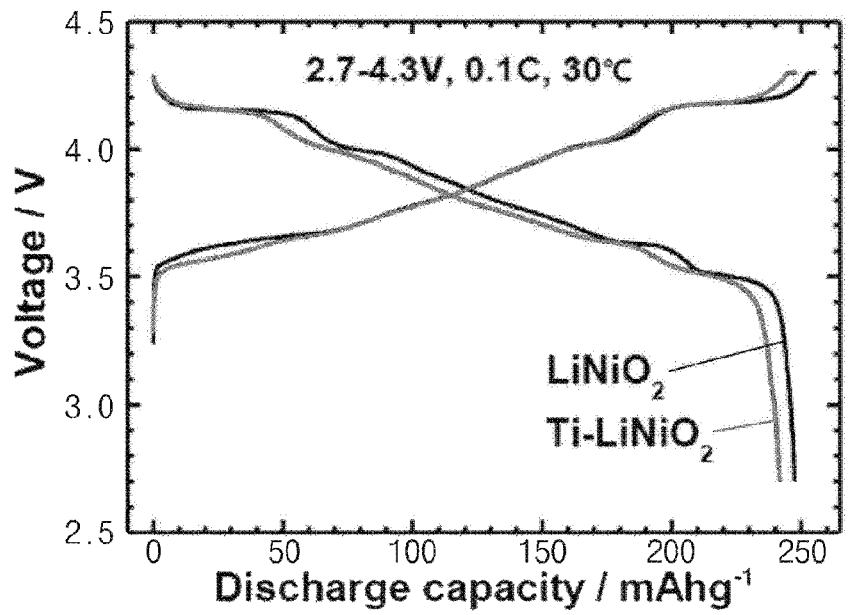
FIG. 22 is a graph illustrating measured capacity characteristics of lithium secondary batteries including the positive active materials according to Example 2 and Comparative Example 1 of the present invention.
Figure 23:
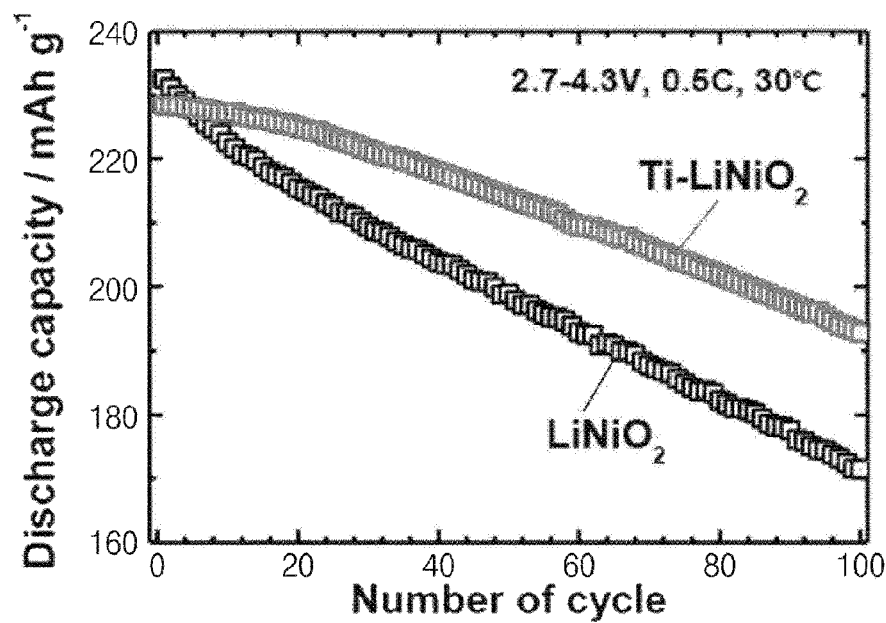
FIG. 23 is a graph illustrating measured life characteristics of lithium secondary batteries including the positive active materials according to Example 2 and Comparative Example 1 of the present invention.

Referring to FIGS. 22 and 23, a half cell was manufactured by using the positive active material according to Example 2, a discharge capacity was measured under the condition of cut off 2.7 to 4.3V and 0.1 C, and a capacity change according to the number of times of the charge/discharge cycle was measured under the condition of cut off 2.7 to 4.3V, 0.5 C, and a temperature of 30° C.

In the drawing, $LiNiO_2$ means the positive active material according to Comparative Example 1, and $Ti-LiNiO_2$ means the positive active material according to Example 2.

TABLE 3

| Classification | 0.1 C, $1^{st}$ Dis-Capa (mAh/g) | $1^{st}$ Efficiency | 0.2 C Capacity (mAh/g) | 0.2 C/0.1 C | 0.5 C Capacity (mAh/g) | 0.5 C/0.1 C | 0.5 C Cycle Retention |
|---|---|---|---|---|---|---|---|
| Comparative Example 1 | 247.5 | 96.8% | 242.3 | 97.9% | 232.5 | 93.9% | 73.7% (100 cycle) |
| Example 2 | 241.8 | 97.3% | 237.1 | 98.0% | 228.4 | 94.4% | 84.4% (100 cycle) |

In the drawing, LNO Pristine means the positive active material according to Comparative Example 1, LNO Zr 0.5 mol % means the positive active material according to Example 1-1, LNO Zr 1.0 mol % means the positive active material according to Example 1-2, and LNO Zr 2.0 mol % means the positive active material according to Example 1-3.

As can be seen in FIGS. 19 and 20, it can be seen that as the charge/discharge process is performed, the capacity of the lithium secondary battery including the positive active material according to Comparative Example 1 is decreased, but the decrease in the capacity of the lithium secondary batteries including the positive active materials according to Examples 1-1 and 1-2 is significantly little. That is, it can be seen that the manufacturing of the lithium secondary battery by using the positive active material doped with zirconium is the effective method of improving a life characteristic.

Further, it can be seen that compared to Example 1-3 in which a doping concentration of zirconium is 2.0 mol %, the life characteristic improvement effect of the positive active materials according to Examples 1-1 and 1-2, in which the doping concentrations of zirconium are 0.5 mol % and 1.0 mol %, respectively, is significantly excellent. That is, it can be seen that the control of the doping concentration of zirconium to be less than 2.0 mol % is the efficient method of improving the life characteristic and the charge/discharge characteristic.

Figure 21:
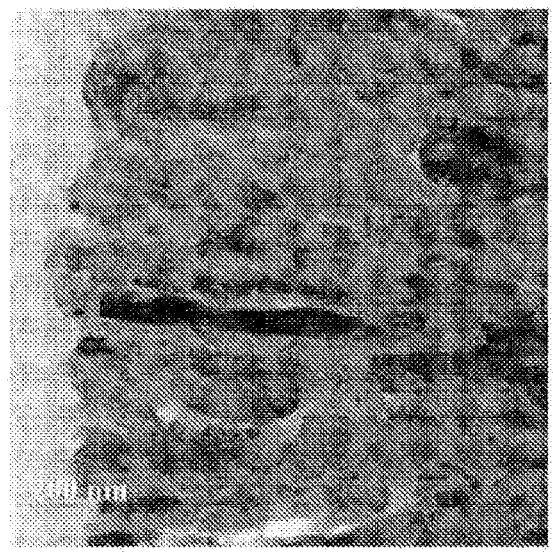
FIG. 21 is a TEM picture and a diagram illustrating an ED pattern of a positive active material according to Example 2 of the present invention.
Figure 21:
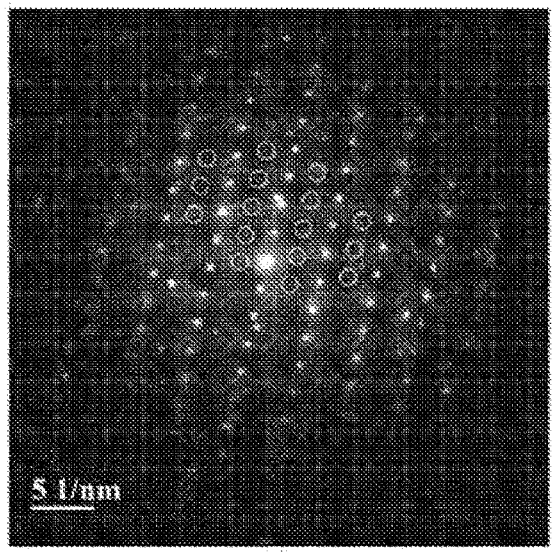

FIG. 21 is a TEM picture and a diagram illustrating an ED pattern of a positive active material according to Example 2 of the present invention.

Referring to FIG. 21, the positive active material doped with titanium according to Example 2 of the present invention was captured by using a TEM and an ED pattern image was checked. As can be seen in FIG. 21, it can be seen that a superlattice is generated by the substitution of a transition metal (nickel) with lithium in a lithium layer and surplus peaks are generated.

Figure 24:
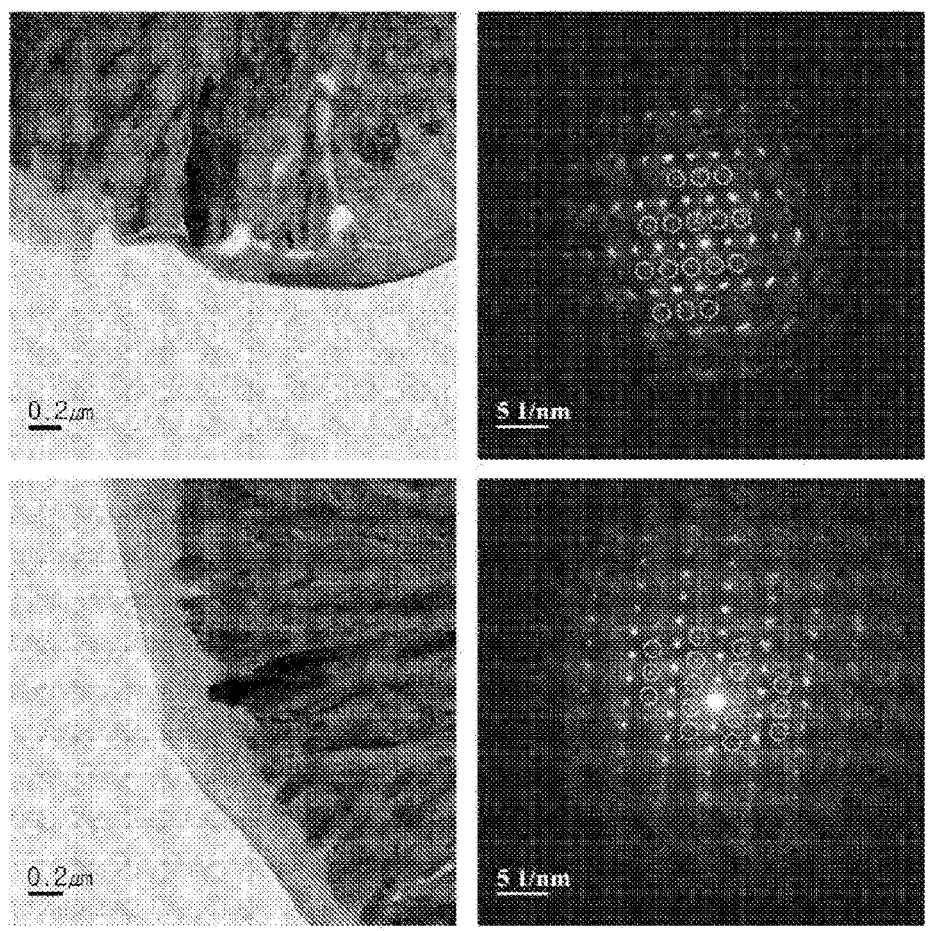
FIG. 24 is a TEM picture and a diagram illustrating an ED pattern of a positive active material according to Example 3 of the present invention.

FIG. 22 is a graph illustrating measured capacity characteristics of lithium secondary batteries including the positive active materials according to Example 2 and Comparative Example 1 of the present invention, and FIG. 23 is a graph illustrating measured life characteristics of lithium secondary batteries including the positive active materials according to Example 2 and Comparative Example 1 of the present invention As can be seen in Table 3 and FIGS. 22 and 23, it can be seen that as the charge/discharge process is performed, the capacity of the lithium secondary battery including the positive active material according to Comparative Example 1 is decreased, but the decrease in the capacity of the lithium secondary battery including the positive active material according to Example 2 is significantly little. That is, it can be seen that the manufacturing of the lithium secondary battery by using the positive active material doped with titanium is the effective method of improving a life characteristic. FIG. 24 is a TEM picture and a diagram illustrating an ED pattern of a positive active material according to Example 3 of the present invention.

Referring to FIG. 24, the positive active material doped with tungsten according to Example 3 of the present invention was captured by using a TEM and an ED pattern image was checked. As can be seen in FIG. 24, it can be seen that a superlattice is generated by the substitution of a transition metal (nickel) with lithium in a lithium layer and surplus peaks are generated.

Figure 25:
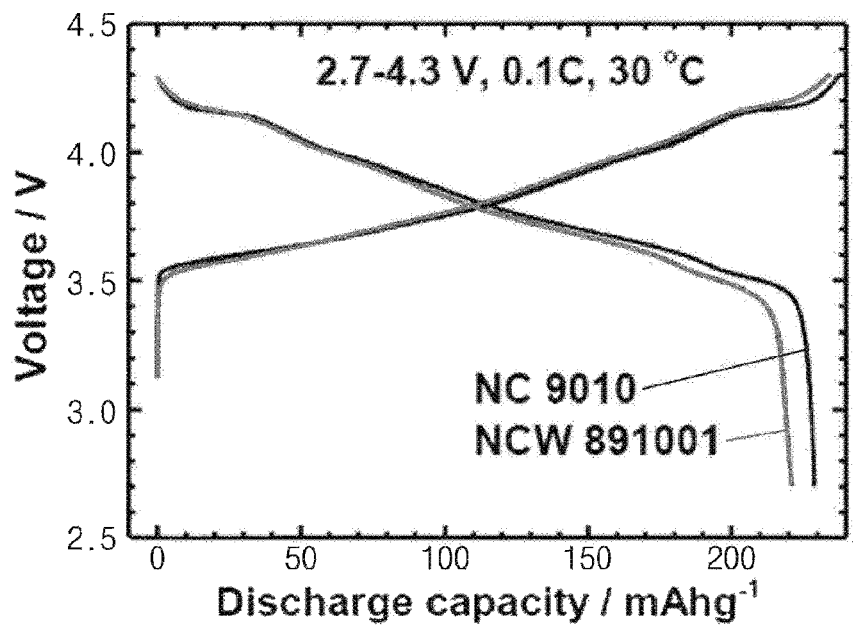
FIG. 25 is a graph illustrating capacity characteristics of lithium secondary batteries including the positive active materials according to Example 3 and Comparative Example 3 of the present invention measured under a condition of 2.7 to 4.3 V.
Figure 26:
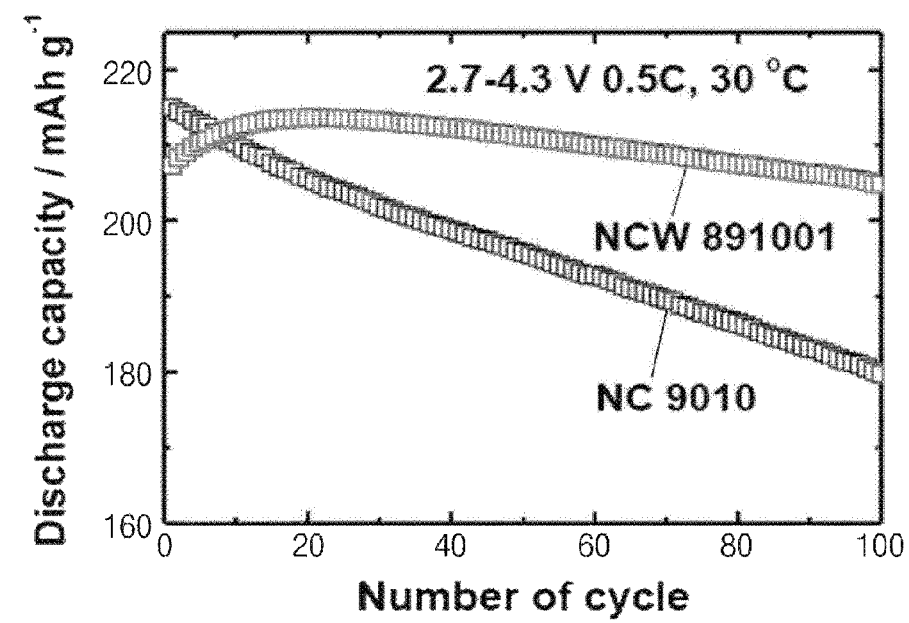
FIG. 26 is a graph illustrating life characteristics of lithium secondary batteries including the positive active materials according to Example 3 and Comparative Example 3 of the present invention measured under a condition of 2.7 to 4.3 V.
Figure 27:
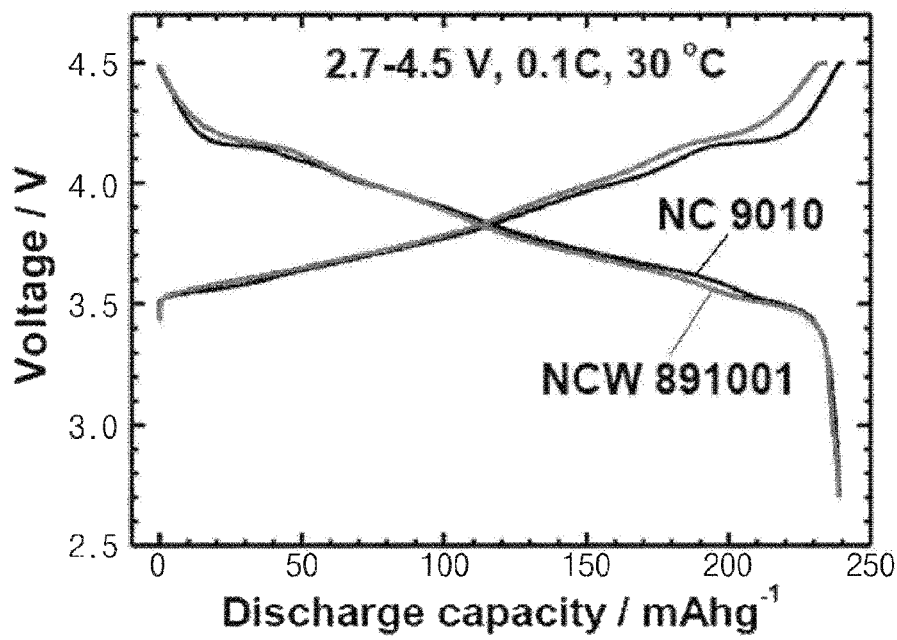
FIG. 27 is a graph illustrating capacity characteristics of lithium secondary batteries including the positive active materials according to Example 3 and Comparative Example 3 of the present invention measured under a condition of 2.7 to 4.5 V.
Figure 28:
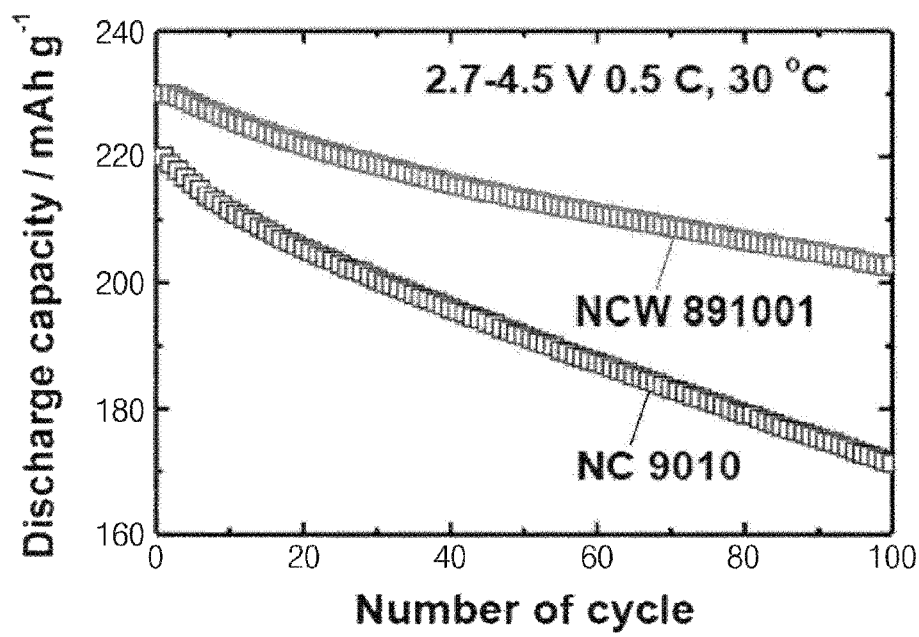
FIG. 28 is a graph illustrating life characteristics of lithium secondary batteries including the positive active materials according to Example 3 and Comparative Example 3 of the present invention measured under a condition of 2.7 to 4.3 V.

FIG. 25 is a graph illustrating capacity characteristics of lithium secondary batteries including the positive active materials according to Example 3 and Comparative Example 3 of the present invention measured under a condition of 2.7 to 4.3 V, FIG. 26 is a graph illustrating life characteristics of lithium secondary batteries including the positive active materials according to Example 3 and Comparative Example 3 of the present invention measured under a condition of 2.7 to 4.3 V, FIG. 27 is a graph illustrating capacity characteristics of lithium secondary batteries including the positive active materials according to Example 3 and Comparative Example 3 of the present invention measured under a condition of 2.7 to 4.5 V, and FIG. 28 is a graph illustrating life characteristics of lithium secondary batteries including the positive active materials according to Example 3 and Comparative Example 3 of the present invention measured under a condition of 2.7 to 4.3 V.

Referring to FIGS. 25 to 28, half cells were manufactured by using the positive active materials according to Example 3 and Comparative Example 3, a discharge capacity was measured under the condition of cut off 2.7 to 4.3V, 2.7 to 4.5V, 0.1C, and a temperature of 30° C., and a capacity change according to the number of times of the charge/discharge cycle was measured under the condition of cut off 2.7 to 4.3V, 2.7 to 4.5V, 0.5C, and a temperature of 30° C.

In the drawing, NC9010 means the positive active material according to Comparative Example 3 and NCW891001 means the positive active material according to Example 3.

Table 4 is the result obtained under the condition of 2.7 to 4.3V and Table 5 is the result obtained under the condition of 2.7 to 4.5V.

TABLE 4

| Classification | 0.1 C, 1$^{st}$ Dis-Capa (mAh/g) | 1$^{st}$ Efficiency | 0.2 C Capacity (mAh/g) | 0.2 C/0.1 C | 0.5 C Capacity (mAh/g) | 0.5 C/0.1 C | 0.5 C Cycle Retention |
|---|---|---|---|---|---|---|---|
| Comparative Example 3 | 229.1 | 96.2% | 224.2 | 97.8% | 214.9 | 93.8% | 83.6% (100 cycle) |
| Example 3 | 221.1 | 94.1% | 216.6 | 98.0% | 207.3 | 93.8% | 98.8% (100 cycle) |

TABLE 5

| Classification | 0.1 C, 1$^{st}$ Dis-Capa (mAh/g) | 1$^{st}$ Efficiency | 0.2 C Capacity (mAh/g) | 0.2 C/0.1 C | 0.5 C Capacity (mAh/g) | 0.5 C/0.1 C | 0.5 C Cycle Retention |
|---|---|---|---|---|---|---|---|
| Comparative Example 3 | 239.1 | 99.3% | 231.7 | 96.9% | 220.0 | 92.0% | 77.9% (100 cycle) |
| Example 3 | 238.9 | 101.9% | 235.3 | 98.5% | 229.9 | 96.2% | 88.2% (100 cycle) |

Figure 29:
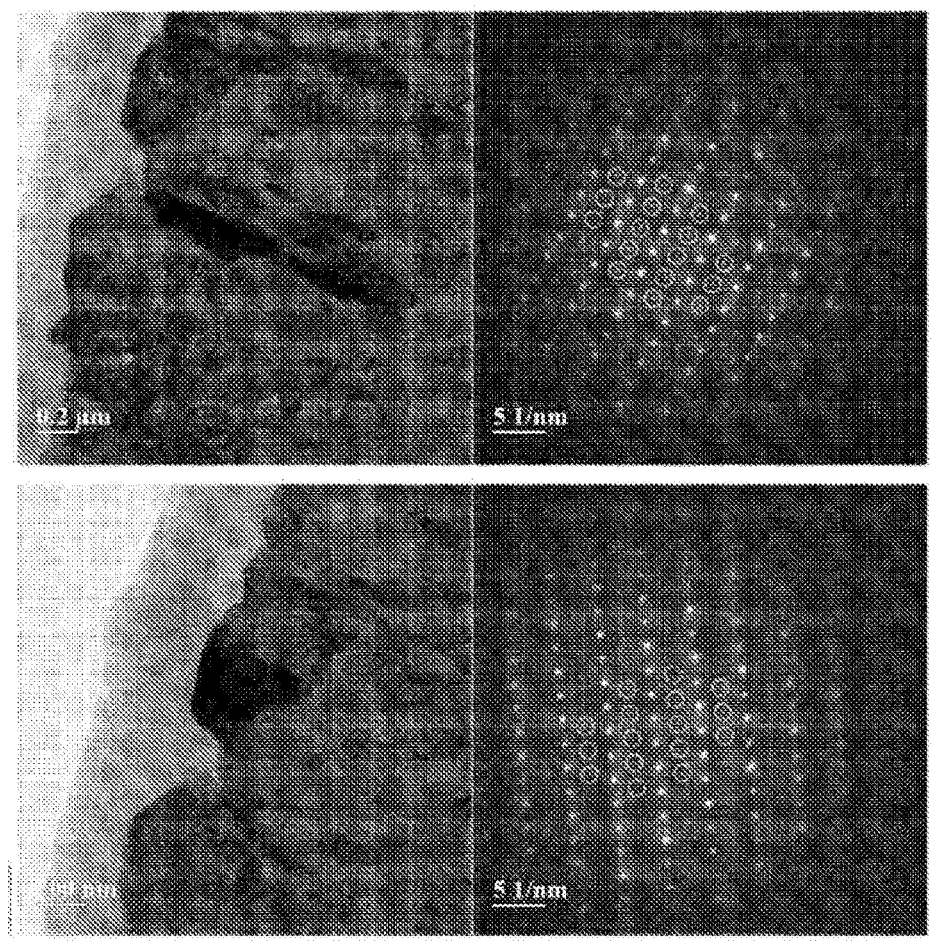
FIG. 29 is a TEM picture and a diagram illustrating an ED pattern of a positive active material according to Example 4 of the present invention.

As can be seen in Tables 4 and 5 and FIGS. 25 to 28, it can be seen that as the charge/discharge process is performed, the capacity of the lithium secondary battery including the positive active material according to Comparative Example 3 is sharply decreased, but the decrease in the capacity of the lithium secondary battery including the positive active material according to Example 3 is significantly little. That is, it can be seen that the manufacturing of the lithium secondary battery by using the positive active material doped with tungsten is the effective method of improving a life characteristic. FIG. 29 is a TEM picture and a diagram illustrating an ED pattern of a positive active material according to Example 4 of the present invention.

Referring to FIG. 29, the positive active material doped with tungsten according to Example 4 of the present invention was captured by using a TEM and an ED pattern image was checked. As can be seen in FIG. 29, it can be seen that a superlattice is generated by the substitution of a transition metal (nickel) with lithium in a lithium layer and surplus peaks are generated.

Figure 30:
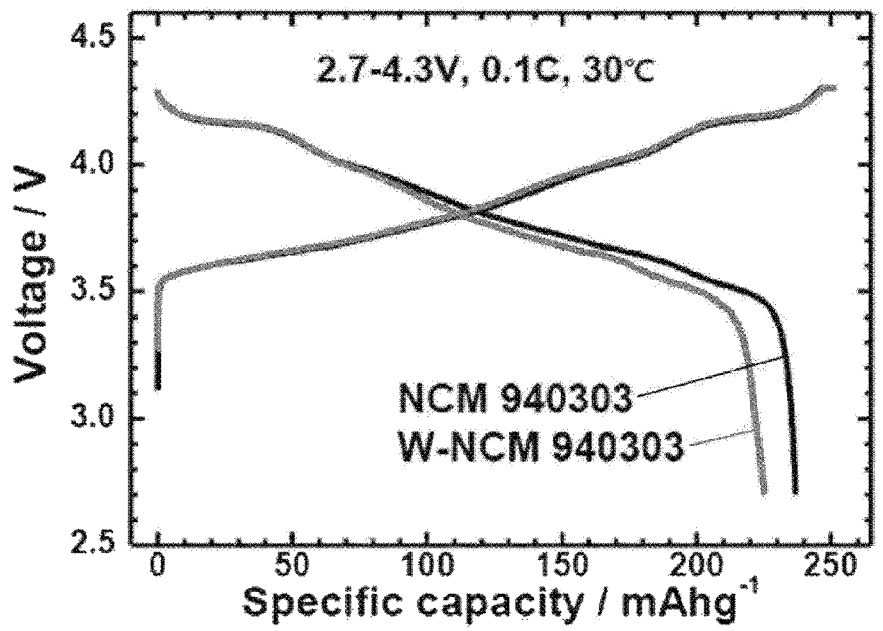
FIG. 30 is a graph illustrating measured capacity characteristics of lithium secondary batteries including the positive active materials according to Example 4 and Comparative Example 4 of the present invention.
Figure 31:
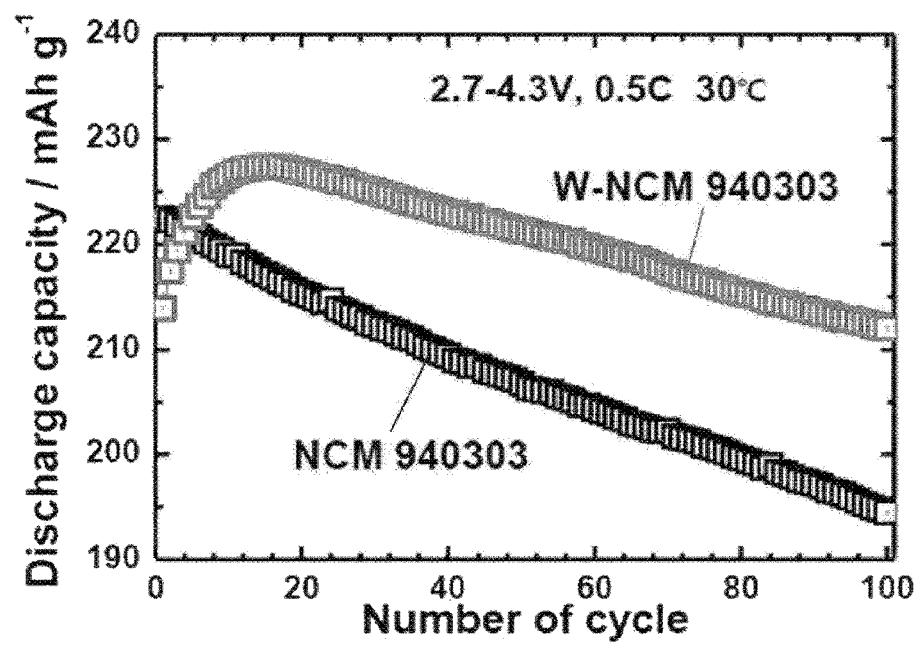
FIG. 31 is a graph illustrating measured life characteristics of lithium secondary batteries including the positive active materials according to Example 4 and Comparative Example 4 of the present invention.

FIG. 30 is a graph illustrating measured capacity characteristics of lithium secondary batteries including the positive active materials according to Example 4 and Comparative Example 4 of the present invention, and FIG. 31 is a graph illustrating measured life characteristics of lithium secondary batteries including the positive active materials according to Example 4 and Comparative Example 4 of the present invention.

Referring to FIGS. 29 and 30, half cells were manufactured by using the positive active materials according to Example 4 and Comparative Example 4, a discharge capacity was measured under the condition of cut off 2.7 to 4.3V, 0.1C, and a temperature of 30° C., and a capacity change according to the number of times of the charge/discharge cycle was measured under the condition of cut off 2.7 to 4.3V, 0.5C, and a temperature of 30° C.

In the drawing, NCM940303 means the positive active material according to Comparative Example 4 and W-NCM940303 means the positive active material according to Example 4.

TABLE 6

| Classification | 0.1 C, 1$^{st}$ Dis-Capa (mAh/g) | 1$^{st}$ Efficiency | 0.2 C Capacity (mAh/g) | 0.2 C/0.1 C | 0.5 C Capacity (mAh/g) | 0.5 C/0.1 C | 0.5 C Cycle Retention |
|---|---|---|---|---|---|---|---|
| Comparative Example 4 | 236.9 | 96.2% | 231.9 | 97.9% | 222.4 | 93.9% | 87.4% (100 cycle) |
| Example 4 | 225.3 | 90.3% | 223.2 | 99.1% | 213.9 | 94.9% | 93.3% (100 cycle) |

Figure 32:
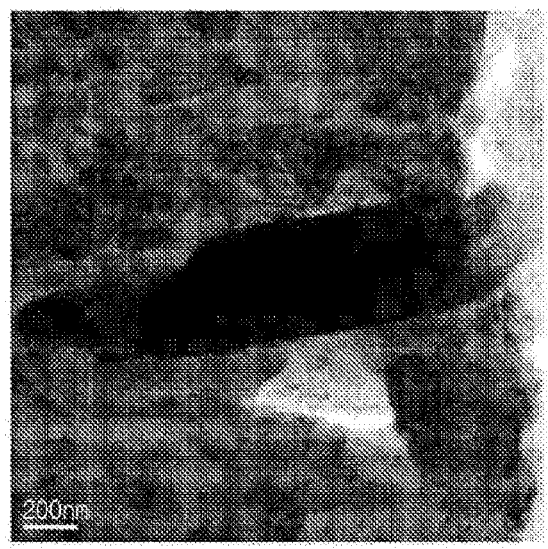
FIG. 32 is a TEM picture and a diagram illustrating an ED pattern of a positive active material according to Example 5 of the present invention.
Figure 32:
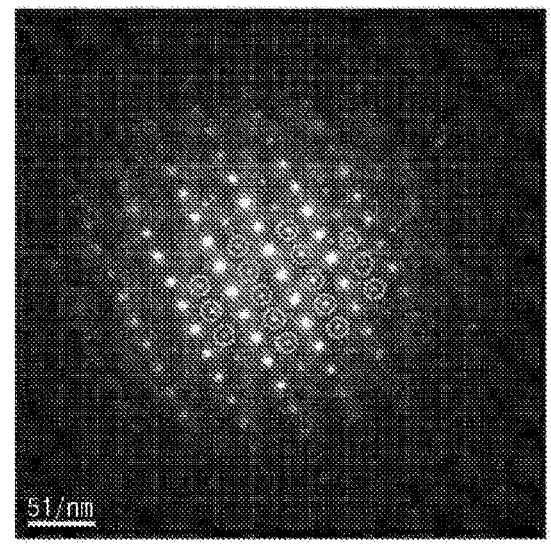

As can be seen in Table 6 and FIGS. 30 and 31, it can be seen that as the charge/discharge process is performed, the capacity of the lithium secondary battery including the positive active material according to Comparative Example 4 is sharply decreased, but the decrease in the capacity of the lithium secondary battery including the positive active material according to Example 4 is significantly little. That is, it can be seen that the manufacturing of the lithium secondary battery by using the positive active material doped with tungsten is the effective method of improving a life characteristic. FIG. 32 is a TEM picture and a diagram illustrating an ED pattern of a positive active material according to Example 5 of the present invention.

Referring to FIG. 32, the positive active material doped with tungsten according to Example 5 of the present invention was captured by using a TEM and an ED pattern image was checked. As can be seen in FIG. 32, it can be seen that a superlattice is generated by the substitution of a transition metal (nickel) with lithium in a lithium layer and surplus peaks are generated.

Figure 33:
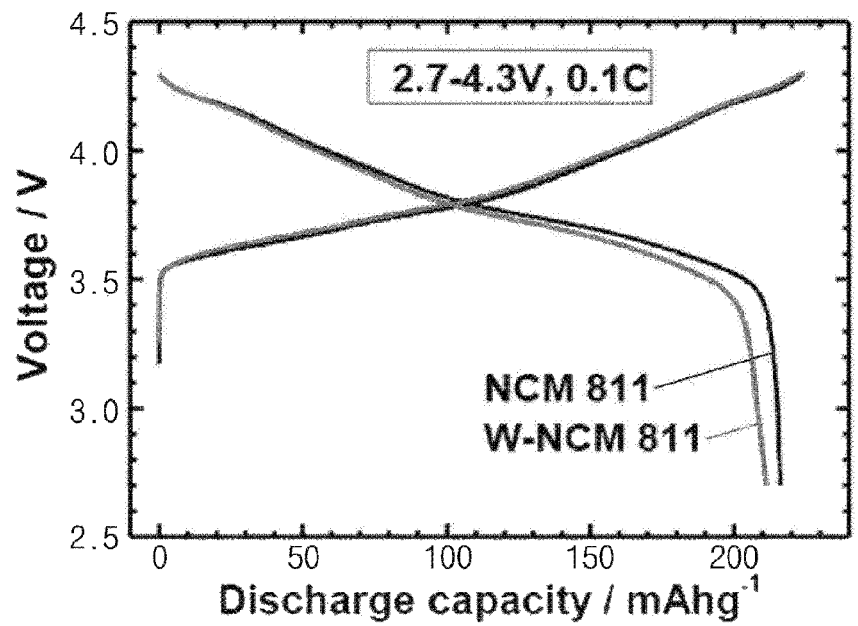
FIG. 33 is a graph illustrating measured capacity characteristics of lithium secondary batteries including the positive active materials according to Example 5 and Comparative Example 5 of the present invention.
Figure 34:
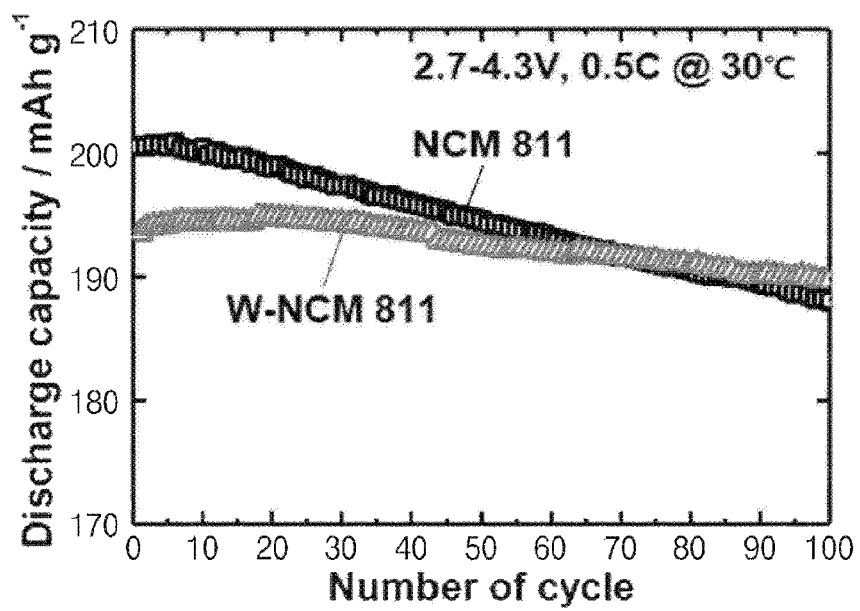
FIG. 34 is a graph illustrating measured life characteristics of lithium secondary batteries including the positive active materials according to Example 5 and Comparative Example 5 of the present invention.
Figure 35:
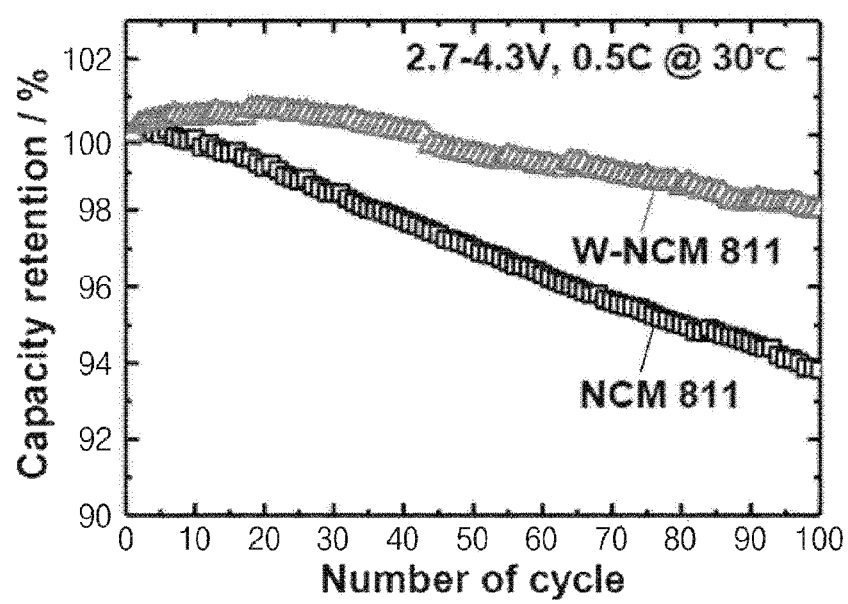
FIG. 35 is a graph illustrating measured retention characteristics of lithium secondary batteries including the positive active materials according to Example 5 and Comparative Example 5 of the present invention.

FIG. 33 is a graph illustrating measured capacity characteristics of lithium secondary batteries including the positive active materials according to Example 5 and Comparative Example 5 of the present invention, FIG. 34 is a graph illustrating measured life characteristics of lithium secondary batteries including the positive active materials according to Example 5 and Comparative Example 5 of the present invention, and FIG. 35 is a graph illustrating a capacity maintenance rate by normalizing the capacity in the y-axis of FIG. 34 in a percentage.

Referring to FIGS. 33 to 35, half cells were manufactured by using the positive active materials according to Example 5 and Comparative Example 5, a discharge capacity was measured under the condition of cut off 2.7 to 4.3V and 0.1C, and a capacity change according to the number of times of the charge/discharge cycle was measured under the condition of cut off 2.7 to 4.3V, 0.5C, and a temperature of 30° C., and a capacity maintenance rate was calculated.

Figure 36:
FIG. 36 is a TEM picture and a diagram illustrating an ED pattern of a positive active material according to Example 6 of the present invention.
Figure 36:
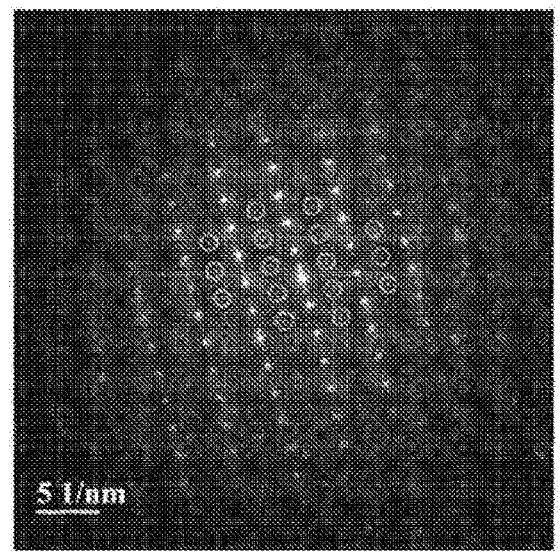

In the drawing, NCM811 means the positive active material according to Comparative Example 5, and W-NCM811 means the positive active material according to Example 5.

invention was captured by using a TEM and an ED pattern image was checked. As can be seen in FIG. 36, it can be seen that a superlattice is generated by the substitution of a transition metal (nickel) with lithium in a lithium layer and surplus peaks are generated.

Figure 37:
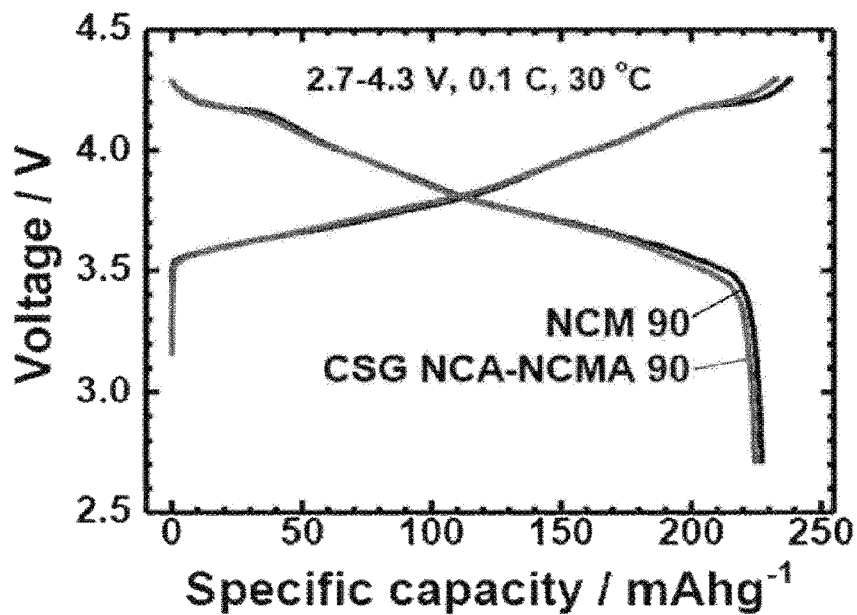
FIG. 37 is a graph illustrating measured capacity characteristics of lithium secondary batteries including the positive active materials according to Example 6 and Comparative Example 6 of the present invention.
Figure 38:
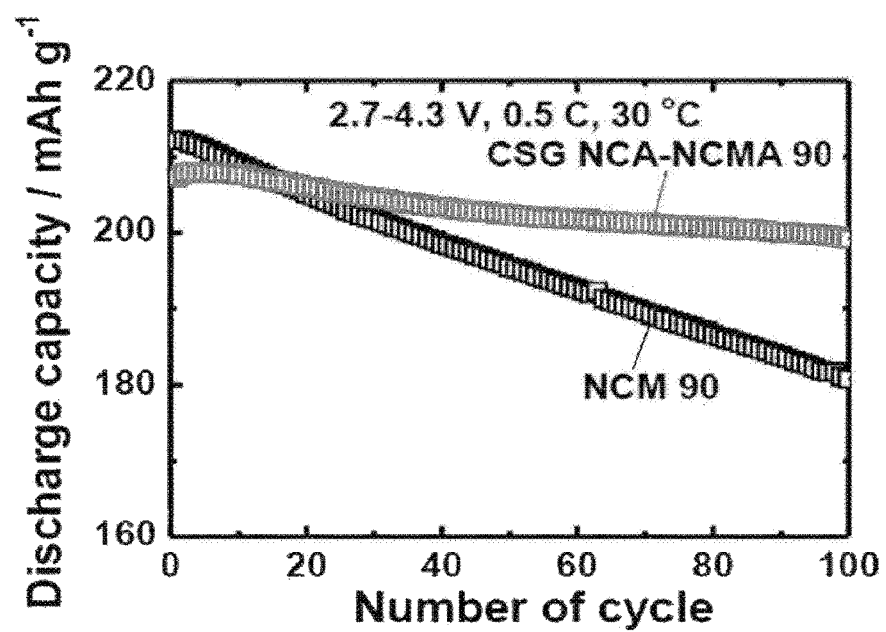
FIG. 38 is a graph illustrating measured life characteristics of lithium secondary batteries including the positive active materials according to Example 6 and Comparative Example 6 of the present invention.

FIG. 37 is a graph illustrating measured capacity characteristics of lithium secondary batteries including the positive active materials according to Example 6 and Comparative Example 6 of the present invention, and FIG. 38 is a graph illustrating measured life characteristics of lithium secondary batteries including the positive active materials according to Example 6 and Comparative Example 6 of the present invention.

Referring to FIGS. 37 and 38, half cells were manufactured by using the positive active materials according to Example 6 and Comparative Example 6, a discharge capacity was measured under the condition of cut off 2.7 to 4.3V and 0.1C, and a capacity change according to the number of times of the charge/discharge cycle was measured under the condition of cut off 2.7 to 4.3V, 0.5C, and a temperature of 30° C.

In the drawing, NCM90 means the positive active material according to Comparative Example 6 and CSG NCA-NCMA 90 means the positive active material according to Example 6.

TABLE 8

| | Classification | | | | |
| --- | --- | --- | --- | --- | --- |
| | 0.1 C, $1^{st}$ Dis-Capa (mAh/g) | $1^{st}$ Efficiency | 0.5 C Capacity (mAh/g) | 0.5 C/ 0.1 C | 0.5 C Cycle Retention |
| Comparative Example 6 | 272.2 | 95.0% | 212.1 | 93.3% | 85.2% (100 cycle) |
| Example 6 | 224.6 | 96.1% | 207.3 | 92.3% | 96.1% (100 cycle) |

As can be seen in Table 8 and FIGS. 37 and 38, it can be seen that as the charge/discharge process is performed, the capacity of the lithium secondary battery including the

TABLE 7

| Classification | 0.1 C, $1^{st}$ Dis-Capa (mAh/g) | $1^{st}$ Efficiency | 0.2 C Capacity (mAh/g) | 0.2 C/0.1 C | 0.5 C Capacity (mAh/g) | 0.5 C/0.1 C | 0.5 C Cycle Retention |
| --- | --- | --- | --- | --- | --- | --- | --- |
| Comparative Example 5 | 216.2 | 95.7% | 210.7 | 97.5% | 200.5 | 92.7% | 93.8% (100 cycle) |
| Example 5 | 211.2 | 94.0% | 204.8 | 97.0% | 193.5 | 91.6% | 98.0% (100 cycle) |

As can be seen in Table 7 and FIGS. 33 to 35, it can be seen that as the charge/discharge process is performed, the capacity of the lithium secondary battery including the positive active material according to Comparative Example 5 is sharply decreased, but the decrease in the capacity of the lithium secondary battery including the positive active material according to Example 5 is significantly little. That is, it can be seen that the manufacturing of the lithium secondary battery by using the positive active material doped with tungsten is the effective method of improving a life characteristic. FIG. 36 is a TEM picture and a diagram illustrating an ED pattern of a positive active material according to Example 6 of the present invention.

Figure 39:
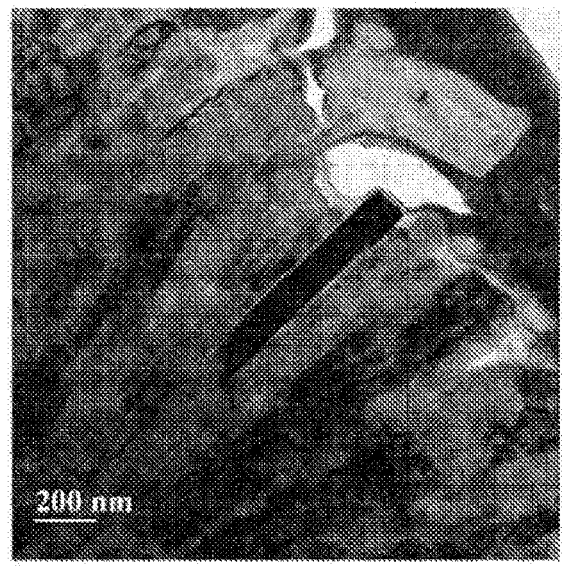
FIG. 39 is a TEM picture and a diagram illustrating an ED pattern of a positive active material according to Example 7 of the present invention.
Figure 39:
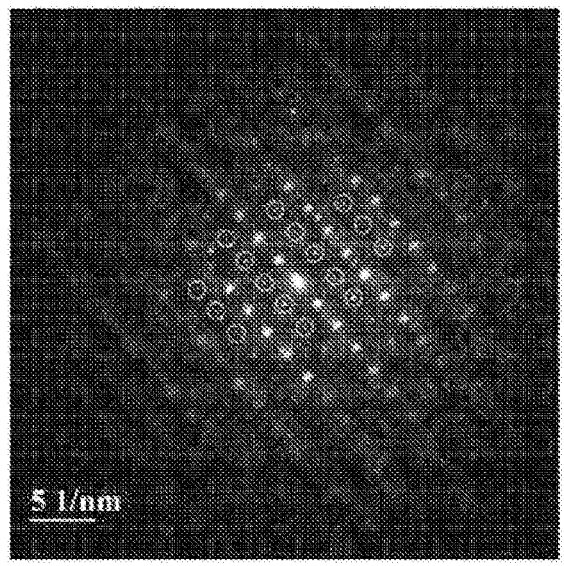

Referring to FIG. 36, the positive active material doped with aluminum according to Example 6 of the present positive active material according to Comparative Example 6 is sharply decreased, but the decrease in the capacity of the lithium secondary battery including the positive active material according to Example 6 is significantly little. That is, it can be seen that the manufacturing of the lithium secondary battery by using the positive active material doped with aluminum is the effective method of improving a life characteristic. FIG. 39 is a TEM picture and a diagram illustrating an ED pattern of a positive active material according to Example 7 of the present invention.

Referring to FIG. 39, the positive active material doped with boron according to Example 7 of the present invention was captured by using a TEM and an ED pattern image was checked. As can be seen in FIG. 36, it can be seen that a superlattice is generated by the substitution of a transition metal (nickel) with lithium in a lithium layer and surplus peaks are generated.

Figure 40:
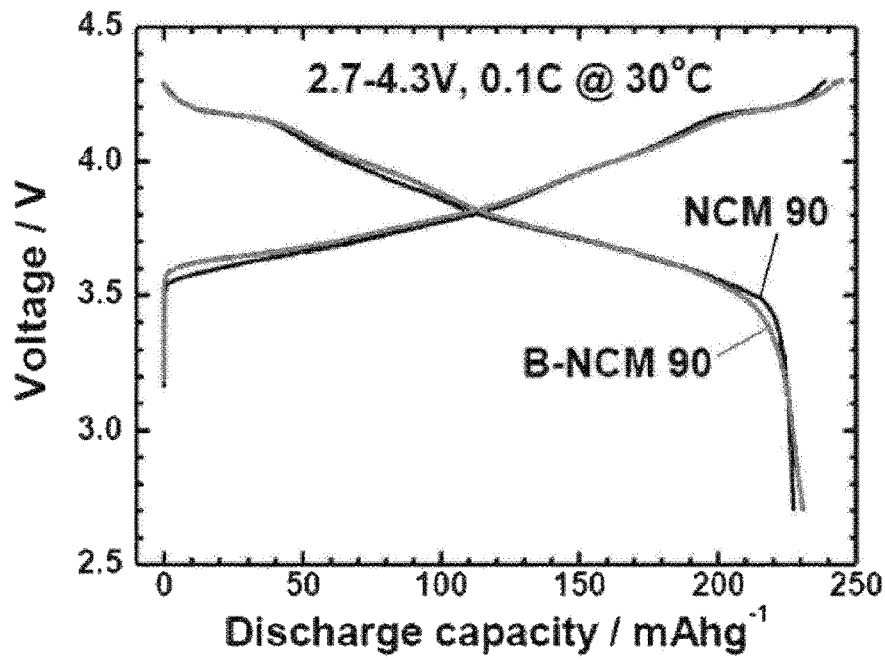
FIG. 40 is a graph illustrating capacity characteristics of lithium secondary batteries including the positive active materials according to Example 7 and Comparative Example 6 of the present invention measured at 30° C.
Figure 41:
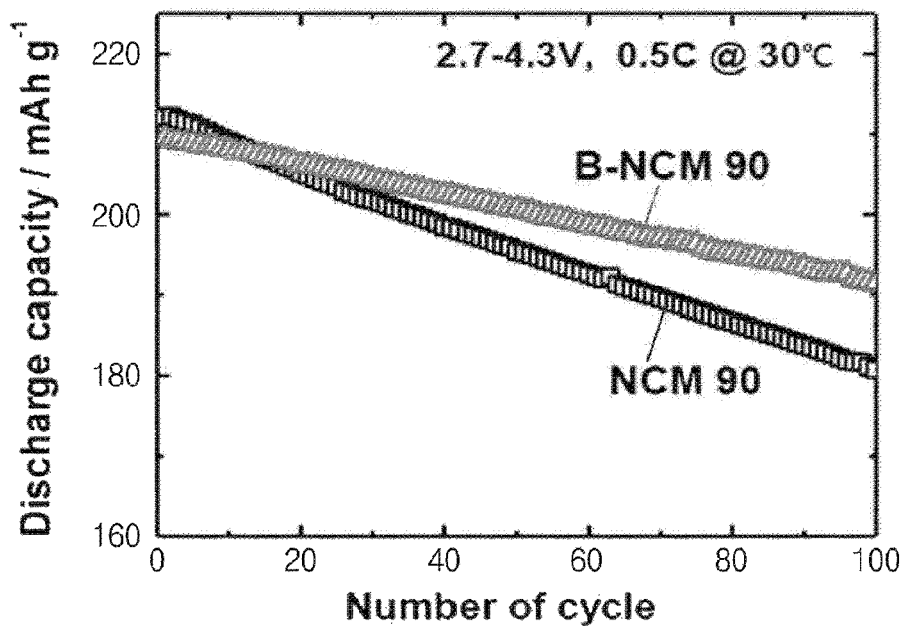
FIG. 41 is a graph illustrating life characteristics of lithium secondary batteries including the positive active materials according to Example 7 and Comparative Example 6 of the present invention measured at 30° C.
Figure 42:
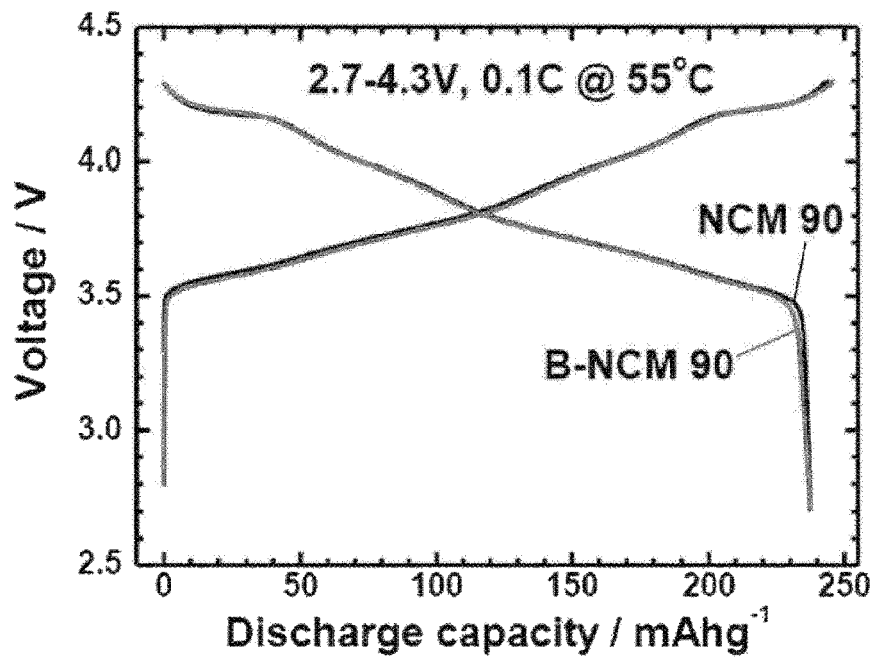
FIG. 42 is a graph illustrating capacity characteristics of lithium secondary batteries including the positive active materials according to Example 7 and Comparative Example 6 of the present invention measured at 55° C.
Figure 43:
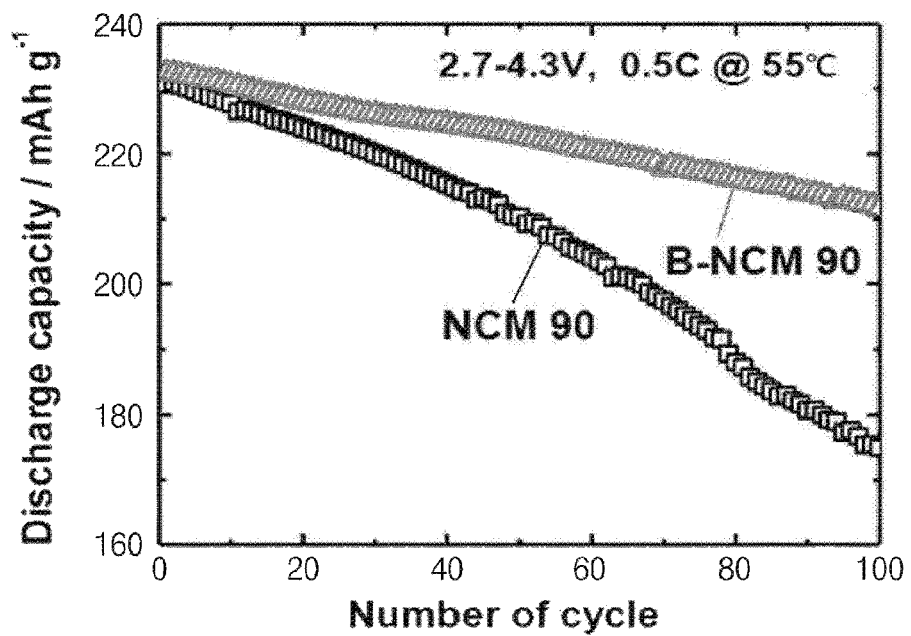
FIG. 43 is a graph illustrating life characteristics of lithium secondary batteries including the positive active materials according to Example 7 and Comparative Example 6 of the present invention measured at 55° C.

FIG. 40 is a graph illustrating capacity characteristics of lithium secondary batteries including the positive active materials according to Example 7 and Comparative Example 6 of the present invention measured at 30° C., FIG. 41 is a graph illustrating life characteristics of lithium secondary batteries including the positive active materials according to Example 7 and Comparative Example 6 of the present invention measured at 30° C., FIG. 42 is a graph illustrating capacity characteristics of lithium secondary batteries including the positive active materials according to Example 7 and Comparative Example 6 of the present invention measured at 55° C., and FIG. 43 is a graph illustrating life characteristics of lithium secondary batteries including the positive active materials according to Example 7 and Comparative Example 6 of the present invention measured at 55° C.

Referring to FIGS. 40 to 43, half cells were manufactured by using the positive active materials according to Example 7 and Comparative Example 6, a discharge capacity was measured under the condition of cut off 2.7 to 4.3V, 0.1C, and temperatures of 30° C. and 50° C., and a capacity change according to the number of times of the charge/discharge cycle was measured under the condition of cut off 2.7 to 4.3V, 0.5C, and temperatures of 30° C. and 50° C.

In the drawing, NCM90 means the positive active material according to Comparative Example 6 and B-NCM 90 means the positive active material according to Example 7.

Table 9 represents the measurement result obtained at 30° C., and Table 10 represents the measurement result obtained at 55° C.

TABLE 9

| | Classification | | | |
|---|---|---|---|---|
| | 0.1 C, 1$^{st}$ Dis-Capa (mAh/g) | 1$^{st}$ Efficiency | 0.5 C Capacity (mAh/g) | 0.5 C Cycle Retention |
| Comparative Example 6 | 227.2 | 95.0% | 212.1 | 85.2% |
| Example 7 | 230.7 | 94.0% | 209.4 | 91.4% |

TABLE 10

| | Classification | | | |
|---|---|---|---|---|
| | 0.1 C, 1$^{st}$ Dis-Capa (mAh/g) | 1$^{st}$ Efficiency | 0.5 C Capacity (mAh/g) | 0.5 C Cycle Retention |
| Comparative Example 6 | 237.4 | 97.2% | 230.7 | 75.8% |
| Example 7 | 237.4 | 96.3% | 232.4 | 91.0% |

As can be seen in Tables 9 and 10 and FIGS. 40 to 43, it can be seen that as the charge/discharge process is performed, the capacity of the lithium secondary battery including the positive active material according to Comparative Example 6 is decreased, but the decrease in the capacity of the lithium secondary battery including the positive active material according to Example 7 is significantly little. That is, it can be seen that the manufacturing of the lithium secondary battery by using the positive active material doped with boron is the effective method of improving a life characteristic.

While the present invention has been described by using the exemplary embodiments, but the present invention is not limited to the specific embodiment, and shall be interpreted by the accompanying claims. Further, it will be understood by those skilled in the art that various changes and modifications may be made without departing from the scope of the present invention.

INDUSTRIAL APPLICABILITY

The positive active material according to the exemplary embodiment of the present invention, the method of preparing the same, a lithium secondary battery including the same are applicable to an electric vehicle, an ESS, and a portable electronic device.

The invention claimed is:

1. A positive active material including lithium, a transition metal,
and oxygen, and including lithium (Li) layers and transition metal layers,
wherein the lithium layers include a first lithium layer including only lithium and a second lithium layer in which at least a part of the lithium of the first lithium layer is alternately substituted with the transition metal,
the transition metal layer includes a first transition metal layer including only the transition metal, and a second transition metal layer in which at least a part of the first transition metal layer is alternately substituted with lithium,
the second lithium layers and the second transition metal layers are alternately and repeatedly provided,
wherein:
in the second lithium layer, a half of the lithium of the first lithium layer is substituted with the transition metal,
in the second transition metal layer, a half of the transition metal of the first transition metal layer is substituted with lithium, and
the transition metal of the second lithium layer is obtained through an exchange of the transition metal of the first transition metal layer and the lithium of the second lithium layer, so that the lithium and the transition metal of the second lithium layer are alternately and repeatedly arranged, and the transition metal and the lithium of the second transition metal layer are alternately and repeatedly provided while corresponding to the lithium and the transition metal of the second lithium layer, respectively,
wherein a lattice formed by the second lithium layer and the second transition metal layer is a superlattice with an a-axis length two times an a-axis length of the lattice formed by the first lithium layer and the first transition metal layer, the superlattice consisting of a plurality of repeating units each including six lithium elements and only one transition metal element,
wherein the transition metal includes nickel, and one or more of cobalt, and manganese, thereby allowing surplus peaks to be generated within the superlattice;
wherein an a-axis of a lattice formed by the second lithium layer and the second transition metal layer includes a lattice with long-range ordering corresponding to the plurality of repeating units, and
wherein the nickel is 79 mol % or more.

2. The positive active material of claim 1, wherein the first lithium layers and the first transition metal layers are alternately and repeatedly arranged, and the second lithium layers and the second transition metal layers are alternately and repeatedly arranged, and a lattice formed by the second lithium layers and the second transition metal layers includes a superlattice.

3. The positive active material of claim 1, further comprising:
a doping metal,
wherein substitution energy of the lithium and the transition metal decreases, and a life characteristic of the positive active material is improved without degradation of a charge/discharge capacity, by the doping metal, so that a part of the lithium of the first lithium layer is substituted with a transition metal to form the second lithium layer, and a part of the transition metal of the first transition metal is substituted with lithium to form the second transition metal layer.

4. The positive active material of claim 3, wherein the doping metal includes at least one of zirconium, boron, titanium, aluminum, and tungsten.

5. The positive active material of claim 3, wherein a concentration of at least one of nickel, cobalt, and manganese in the positive active material has a concentration gradient in at least a part of the positive active material in a direction from a center to a surface of the positive active material.

6. The positive active material of claim 1, wherein:
as a result of an electron diffraction pattern for a zone axis or a zone axis,
a first diffraction spot group which corresponds to a lattice formed by the first lithium layer and the first transition metal layer and is formed by aligning one or more diffraction spots having relatively high strength in one direction, and a second diffraction spot group which corresponds to a lattice formed by the second lithium layer and the second transition metal layer and is formed by aligning one or more diffraction spots having relatively lower strength than the strength of the diffraction spot included in the first diffraction spot group in one direction are observed,
wherein the positive active material includes lithium, a transition metal, and oxygen, the transition metal includes nickel, and one or more of cobalt, and manganese, and the nickel is 79 mol % or more.

7. The positive active material of claim 6, wherein in the second lithium layer, the lithium and the transition metal are alternately arranged,
in the second transition metal layer, the transition metal and the lithium are alternately arranged.

8. The positive active material of claim 6, wherein the first diffraction spot group and the second diffraction spot group are alternately and repeatedly arranged, and
the first diffraction spot group and the second diffraction spot group are provided while being spaced apart from each other at the same interval.

9. A positive active material comprising:
lithium;
a transition metal;
oxygen;
lithium (Li) layers;
transition metal layers; and
a doping metal including boron,
wherein:
the lithium layers include a first lithium layer including only lithium and a second lithium layer in which at least a part of the lithium of the first lithium layer is alternately substituted with the transition metal,
the transition metal layer includes a first transition metal layer including only the transition metal, and a second transition metal layer in which at least a part of the first transition metal layer is alternately substituted with lithium,
the second lithium layers and the second transition metal layers are alternately and repeatedly provided,
in the second lithium layer, a half of the lithium of the first lithium layer is substituted with the transition metal,
in the second transition metal layer, a half of the transition metal of the first transition metal layer is substituted with lithium,
the transition metal of the second lithium layer is obtained through an exchange of the transition metal of the first transition metal layer and the lithium of the second lithium layer, so that the lithium and the transition metal of the second lithium layer are alternately and repeatedly arranged, and the transition metal and the lithium of the second transition metal layer are alternately and repeatedly provided while corresponding to the lithium and the transition metal of the second lithium layer, respectively,
a lattice formed by the second lithium layer and the second transition metal layer is a superlattice with an a-axis length two times an a-axis length of the lattice formed by the first lithium layer and the first transition metal layer, the superlattice consisting of a plurality of repeating units each including six lithium elements and only one transition metal element,
the transition metal includes nickel, and one or more of cobalt, and manganese, thereby allowing surplus peaks to be generated within the superlattice;
the nickel is 79 mol % or more;
an a-axis of a lattice formed by the second lithium layer and the second transition metal layer includes a lattice with long-range ordering corresponding to the plurality of repeating units, and
substitution energy of the lithium and the transition metal decreases by the doping metal.

10. A positive active material comprising:
lithium;
a transition metal;
oxygen;
lithium (Li) layers; and
transition metal layers,
wherein:
the lithium layers include a first lithium layer including only lithium and a second lithium layer in which at least a part of the lithium of the first lithium layer is alternately substituted with the transition metal,
the transition metal layer includes a first transition metal layer including only the transition metal, and a second transition metal layer in which at least a part of the first transition metal layer is alternately substituted with lithium,
the second lithium layers and the second transition metal layers are alternately and repeatedly provided,
in the second lithium layer, a half of the lithium of the first lithium layer is substituted with the transition metal,
in the second transition metal layer, a half of the transition metal of the first transition metal layer is substituted with lithium,
the transition metal of the second lithium layer is obtained through an exchange of the transition metal of the first transition metal layer and the lithium of the second lithium layer, so that the lithium and the transition metal of the second lithium layer are alternately and repeatedly arranged, and the transition metal and the lithium of the second transition metal layer are alternately and repeatedly provided while corresponding to the lithium and the transition metal of the second lithium layer, respectively, a lattice formed by the second lithium layer and the second transition metal layer is a superlattice with an a-axis length two times an a-axis length of the lattice formed by the first lithium layer and the first transition metal layer, the transition metal includes nickel, and one or more of cobalt, and manganese, thereby allowing surplus peaks to be generated within the superlattice;

the nickel is 79 mol % or more;

the superlattice consists of a plurality of repeating units each including six lithium elements and only one transition metal element, and an a-axis of a lattice formed by the second lithium layer and the second transition metal layer includes a lattice with long-range ordering corresponding to the plurality of repeating units.

* * * * *